US012651371B2

(12) United States Patent
Zhou et al.

(10) Patent No.: US 12,651,371 B2
(45) Date of Patent: Jun. 9, 2026

(54) VISUAL POSITIONING METHOD, STORAGE MEDIUM AND ELECTRONIC DEVICE

(71) Applicant: GUANGDONG OPPO MOBILE TELECOMMUNICATIONS CORP., LTD., Dongguan (CN)

(72) Inventors: Yuhao Zhou, Dongguan (CN); Jijunnan Li, Dongguan (CN); Yandong Guo, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 336 days.

(21) Appl. No.: 18/372,477

(22) Filed: Sep. 25, 2023

(65) Prior Publication Data

US 2024/0029297 A1     Jan. 25, 2024

Related U.S. Application Data

(63) Continuation of application No. PCT/CN2022/078435, filed on Feb. 28, 2022.

(30) Foreign Application Priority Data

Mar. 29, 2021    (CN) .......................... 202110336267.8

(51) Int. Cl.
G06T 7/73        (2017.01)
G06T 7/33        (2017.01)
G06V 10/46       (2022.01)
G06V 10/75       (2022.01)

(52) U.S. Cl.
CPC .................. G06T 7/73 (2017.01); G06T 7/33 (2017.01); *G06T 2207/20084* (2013.01)

(58) Field of Classification Search
CPC ............... G06T 7/74; G06T 7/73; G06T 7/33
See application file for complete search history.

(56) References Cited

U.S. PATENT DOCUMENTS

2017/0343356 A1    11/2017    Roumeliotis et al.
2020/0167943 A1 *    5/2020    Kim .......................... G06N 3/09
2023/0360262 A1 *    11/2023    He ............................. G06T 7/77

FOREIGN PATENT DOCUMENTS

CN            103543434 A        1/2014
CN            106910210 A        6/2017
(Continued)

OTHER PUBLICATIONS

Pyojin Kim "Low-Drift Visual Odometry for Indoor Robotics" Dissertation—Seoul National University (Year: 2019).*
(Continued)

*Primary Examiner* — Oneal R Mistry
*Assistant Examiner* — Nhut Huy Pham
(74) *Attorney, Agent, or Firm* — Sheppard, Mullin, Richter & Hampton LLP

(57)    ABSTRACT

Provided are a visual positioning method, a non-transitory computer-readable storage medium and an electronic device. Surface normal vectors of a current image frame is obtained. A first transformation parameter between the current image frame and a reference image frame is determined, by projecting the surface normal vectors to a Manhattan coordinate system. A matching operation between feature points of the current image frame and feature points of the reference image frame is performed, and a second transformation parameter between the current image frame and the reference image frame is determined based on a matching result. A target transformation parameter is obtained, based on the first transformation parameter and the second transformation parameter. A visual localization result corresponding to the current image frame is output, based on the target transformation parameter.

20 Claims, 9 Drawing Sheets

(56) References Cited

FOREIGN PATENT DOCUMENTS

| | | |
|---|---|---|
| CN | 107229055 A | 10/2017 |
| CN | 107292956 A | 10/2017 |
| CN | 107292965 A | 10/2017 |
| CN | 108717712 A | 10/2018 |
| CN | 109544677 A | 3/2019 |
| CN | 109814572 A | 5/2019 |
| CN | 109974693 A | 7/2019 |
| CN | 110322500 A | 10/2019 |
| CN | 110335316 A | 10/2019 |
| CN | 111768489 A | 10/2020 |
| CN | 111784776 A | 10/2020 |
| CN | 111967481 A | 11/2020 |

OTHER PUBLICATIONS

Ning, Ruixin "Visual Positioning and Mapping of Indoor Robotics" Master Thesis—Hangzhou Dianzi University, (Year: 2020).*

Ning, Ruixin "Visual Positioning and Mapping of Indoor Robotics" Master Thesis—Hangzhou Dianzi University, (Year: 2021).*

Gao, Ge, et al. "6d object pose regression via supervised learning on point clouds." IEEE (Year: 2020).*

CNIPA, Office Action issued for CN Application No. 202110336267. 8, Apr. 26, 2023.

CNIPA, First Office Action for CN Application No. 202110336267. 8, Dec. 20, 2022.

Ning Ruixin, Indoor robot visual localization and mapping, China Outstanding Master's Degree Thesis Full Text Database, Feb. 15, 2021, ISSN:1674-0246, Chapter 3.

Structure-SLAM: Low-Drift Monocular SLAM in Indoor Environments, Yanyan Li, Aug. 5, 2020.

Monocular SLAM methods in structured environments, Salt Particles, Aug. 24, 2020.

Divide and Conquer: Efficient Density-Based Tracking of 3D Sensors in Manhattan Worlds, Sep. 4, 2017, Yi Zhou.

WIPO, International Search Report for PCT Application No. PCT/CN2022/078435, Feb. 28, 2022.

* cited by examiner

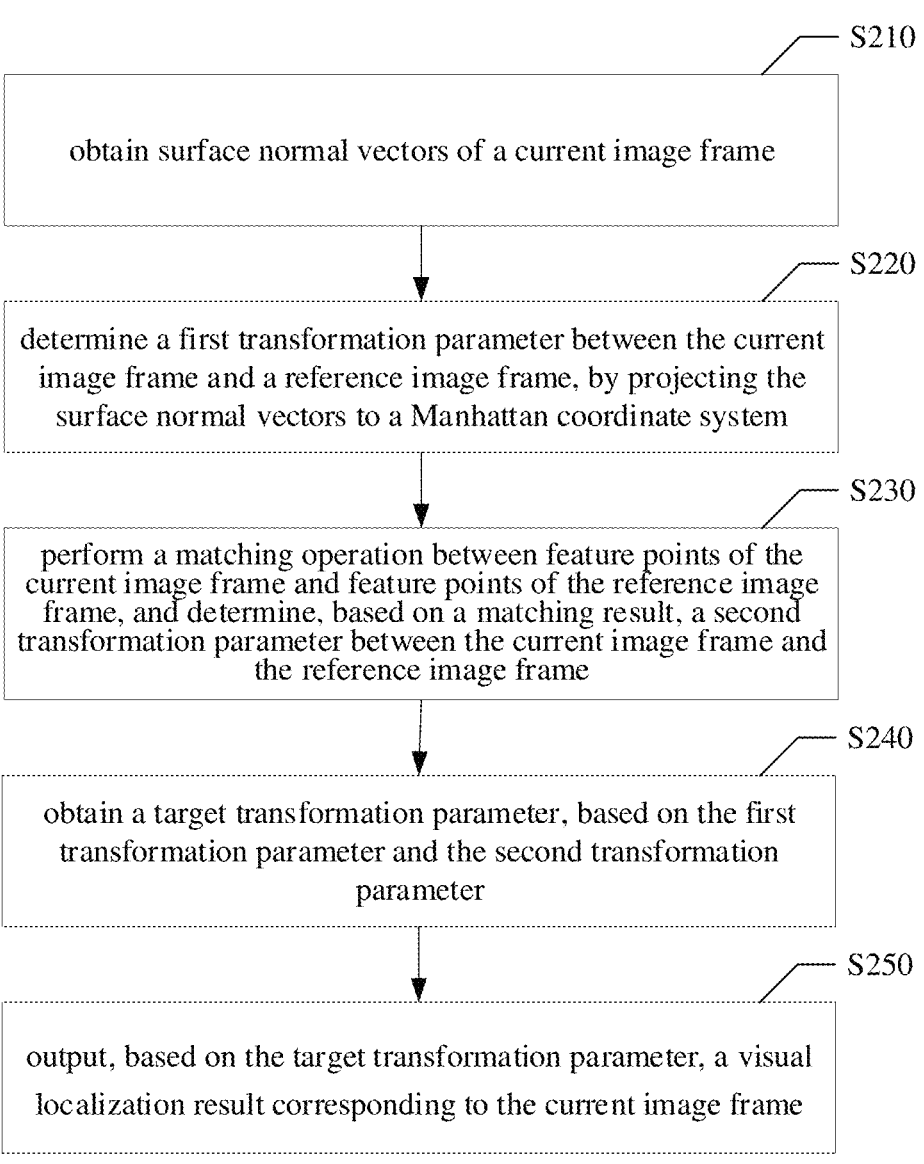

S210 obtain surface normal vectors of a current image frame

S220 determine a first transformation parameter between the current image frame and a reference image frame, by projecting the surface normal vectors to a Manhattan coordinate system

S230 perform a matching operation between feature points of the current image frame and feature points of the reference image frame, and determine, based on a matching result, a second transformation parameter between the current image frame and the reference image frame

S240 obtain a target transformation parameter, based on the first transformation parameter and the second transformation parameter

S250 output, based on the target transformation parameter, a visual localization result corresponding to the current image frame

FIG. 2

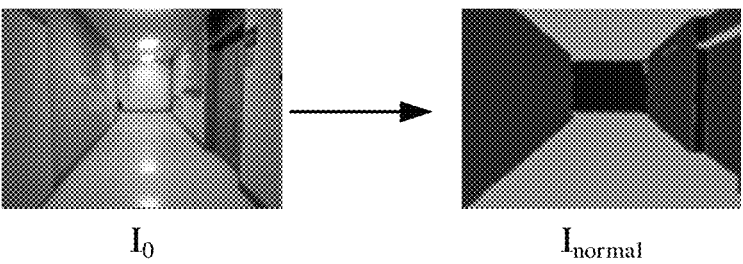

$I_0$                                    $I_{normal}$

FIG. 3

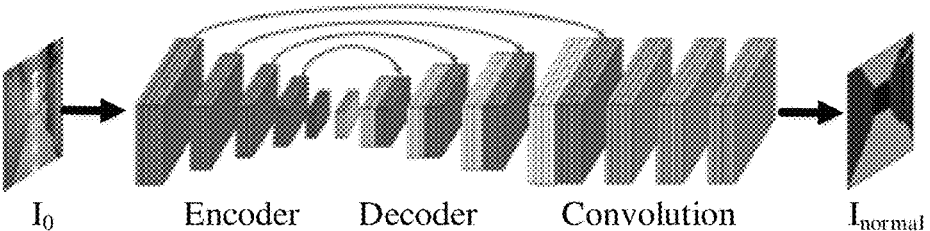

$I_0$    Encoder   Decoder   Convolution    $I_{normal}$

FIG. 4

S510 obtain a down-sampled intermediate image and a down-sampled target image, by down-sampling the current image frame through the encoder

S520 obtain an up-sampled target image, by up-sampling the down-sampled target image and performing a concatenation operation on the down-sampled target image after undergoing the up-sampling and the down-sampled intermediate image, through the decoder

S530 obtain the surface normal vectors, by performing a convolution operation on the up-sampled target image through the convolutional sub-network

FIG. 5

S610 map, based on a transformation parameter for transformation from a camera coordinate system corresponding to the reference image frame to the Manhattan coordinate system, the surface normal vectors to the Manhattan coordinate system

S620 determine, based on an offset of the surface normal vectors in the Manhattan coordinate system, a transformation parameter for transformation from the camera coordinate system corresponding to the current image frame to the Manhattan coordinate system

S630 determine the first transformation parameter between the current and reference image frames, based on the transformation parameter for transformation from the camera coordinate system corresponding to the reference image frame to the Manhattan coordinate system and the transformation parameter for transformation from the camera coordinate system corresponding to the current image frame to the Manhattan coordinate system

FIG. 6 reference image frame          current image frame determine a first pose corresponding to the current image frame, based on the target transformation parameter and a pose corresponding to the reference image frame

S1020 project, based on the first pose, a three-dimensional point cloud of a target scene to a plane of the current image frame, and obtain corresponding projection points

S1030 perform a matching operation between the feature points of the current image frame and the projection points, and determine, based on matching point pairs of the feature points of the current image frame and the projection point, a second pose corresponding to the current image frame

S1040 output the second pose as the visual localization result corresponding to the current image frame

FIG. 10

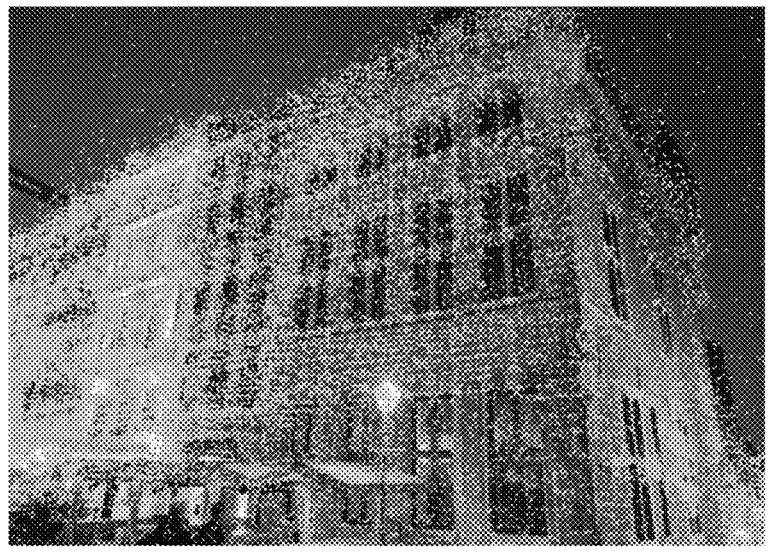

FIG. 11

S1210 obtain third matching information by performing the matching operation from the projection points to the feature points of the current image frame

S1220 obtain fourth matching information by performing the matching operation from the feature points of the current image frame to the projection points

S1230 based on the third matching information and the fourth matching information, obtain matching point pairs of the feature points of the current image frame and the projection points

FIG. 12

FIG. 13

VISUAL POSITIONING METHOD, STORAGE MEDIUM AND ELECTRONIC DEVICE

CROSS-REFERENCE OF RELATED APPLICATIONS

This application is a continuation of International Application No. PCT/CN2022/078435, filed Feb. 28, 2022, which claims priority to Chinese patent application No. 202110336267.8, filed Mar. 29, 2021, both of which are incorporated herein by reference in their entireties.

TECHNICAL FIELD

The disclosure relates to the technical field of computer vision, and particularly to a visual localization method, a non-transitory computer-readable storage medium, and an electronic device.

BACKGROUND

Visual localization is a new type of localization technology, in which environmental images are captured through image acquisition devices (such as a mobile phone, and an RGB camera), and a current pose is calculated and updated in real-time, based on an image algorithm and mathematical reasoning. The visual localization has advantages of high speed, high precision and ease to use, and has been widely used in scenarios such as augmented reality (AR), and indoor navigation.

In the related art, for the visual localization, it is usually necessary to perform feature extraction and feature matching on the image to compute the pose. Accordingly, the localization result greatly depends on the quality of features in the image. However, in a case where there is weak texture in the visual environment, the quality of the extracted feature of the image would be affected, resulting in localization drift or even localization failure.

SUMMARY

The disclosure provides a visual localization method, a non-transitory computer-readable storage medium, and an electronic device.

A visual localization method is provided according to an aspect of the disclosure. The method includes: obtaining surface normal vectors of a current image frame; determining a first transformation parameter between the current image frame and a reference image frame, by projecting the surface normal vectors to a Manhattan coordinate system; performing a matching operation between feature points of the current image frame and feature points of the reference image frame, and determining, based on a matching result, a second transformation parameter between the current image frame and the reference image frame; obtaining a target transformation parameter, based on the first transformation parameter and the second transformation parameter; and outputting, based on the target transformation parameter, a visual localization result corresponding to the current image frame.

A non-transitory computer-readable storage medium is provided according to another aspect of the disclosure. The computer-readable storage medium stores a computer program thereon, and the computer program, when being executed by a processor, causes the visual localization method of the first aspect and possible implementations thereof to be implemented. In some embodiments, the method includes: obtaining surface normal vectors of a current image frame; determining, based on projections of the surface normal vectors on a Manhattan coordinate system, a first transformation parameter between the current image frame and a reference image frame; determining a second transformation parameter between the current image frame and the reference image frame, by performing a matching operation between feature points of the current image frame and feature points of the reference image frame; obtaining a target transformation parameter, based on the first transformation parameter and the second transformation parameter; and outputting, based on the target transformation parameter, a visual localization result corresponding to the current image frame.

An electronic device is provided according to yet another aspect of the disclosure. The electronic device includes a processor and a memory. The memory is configured to store executable instructions for the processor. The processor is configured to execute the executable instructions to implement the visual localization method of the first aspect and possible implementations thereof. In some embodiments, the method includes: obtaining surface normal vectors of a current image frame; determining, based on projections of the surface normal vectors on a Manhattan coordinate system, a first transformation parameter between the current image frame and a reference image frame; determining a second transformation parameter between the current image frame and the reference image frame, by performing a matching operation between feature points of the current image frame and feature points of the reference image frame; obtaining a target transformation parameter, based on the first transformation parameter and the second transformation parameter; and outputting, based on the target transformation parameter, a visual localization result corresponding to the current image frame.

Other features and aspects of the disclosed features will become apparent from the following detailed description, taken in conjunction with the accompanying drawings, which illustrate, by way of example, the features in accordance with embodiments of the disclosure. The summary is not intended to limit the scope of any embodiments described herein.

BRIEF DESCRIPTION OF THE DRAWINGS

FIG. 2 is a schematic flowchart of a visual localization method according to some exemplary embodiments.

FIG. 3 is a schematic diagram illustrating a current image frame and surface normal vectors according to some exemplary embodiments.

FIG. 4 is a schematic diagram illustrating a process performed by a surface-normal-vector estimation network according to some exemplary embodiments.

FIG. 5 is a schematic flowchart of acquiring surface normal vectors according to some exemplary embodiments.

FIG. 6 is a schematic flowchart of determining a first transformation parameter according to some exemplary embodiments.

FIG. 10 is a schematic flowchart of outputting a visual localization result according to some exemplary embodiments.

FIG. 11 is a schematic diagram illustrating projections of a three-dimensional point cloud according to some exemplary embodiments.

FIG. 12 is a schematic flowchart of performing a matching operation between feature points and projection points according to some exemplary embodiments.

FIG. 13 is a schematic diagram illustrating a three-dimensional point cloud of a target scene according to some exemplary embodiments.

DETAILED DESCRIPTION OF PREFERRED EMBODIMENTS

Figure 1:
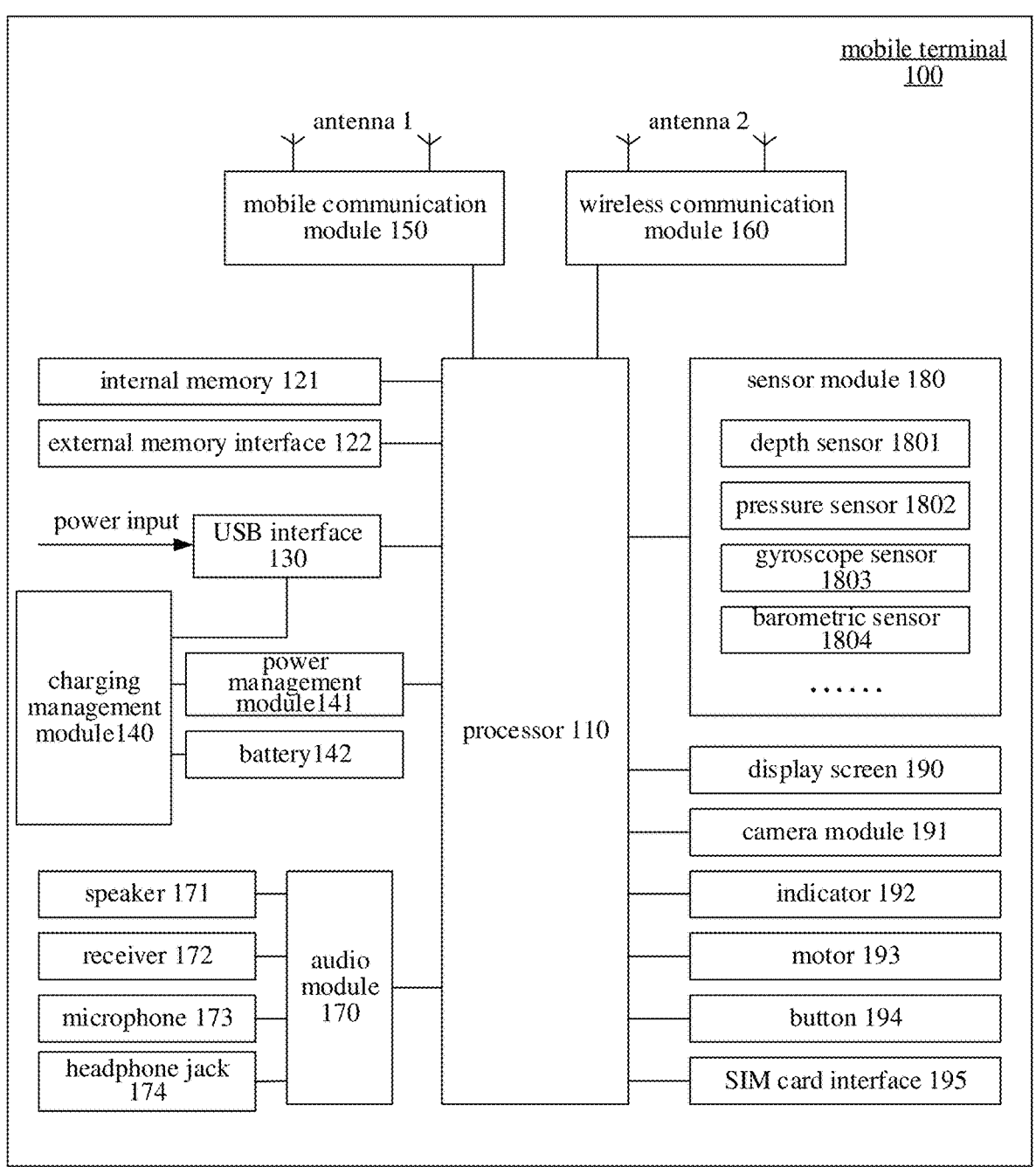
FIG. 1 is a schematic structural diagram of an electronic device according to some exemplary embodiments.

Exemplary embodiments are now described comprehensively with reference to the accompanying drawings. However, the exemplary embodiments may be implemented in various forms, and should not be construed as being limited to examples described herein. Instead, the embodiments are provided so that the disclosure is more comprehensive and complete, and a concept of the exemplary embodiments is fully conveyed to those skilled in the art. The described features, structures, or characteristics may be combined in one or more embodiments in any appropriate manner. In the following description, many specific details are provided to give a full understanding of the exemplary embodiments of the disclosure. However, it should be appreciated by those skilled in the art that one or more of the specific details may be omitted during the practice of technical solutions of the disclosure, or other methods, components, apparatus, operations, or the like may be used. In other cases, well-known technical solutions are not shown or described in detail to avoid overwhelming the subject and thus obscuring various aspects of the disclosure.

In addition, the drawings are only schematic illustrations of the disclosure and are not necessarily drawn to scale. The same reference numerals in the drawings denote the same or similar portions, and thus repetitions of the same reference numerals will be omitted. Some of the block diagrams illustrated in the drawings represent functional entities and do not necessarily correspond to physically or logically independent entities. These functional entities may be implemented in software, or implemented in one or more hardware modules or integrated circuits, or implemented in different networks and/or processor devices and/or microcontroller devices.

The flowcharts illustrated in the drawings are merely illustrative and do not necessarily include all operations. For example, some operations may be decomposed, and some operations may be combined or partially combined, so that an actual execution order may be changed according to an actual situation.

To improve an accuracy of visual localization in an environment of weak texture, a solution using an auxiliary sensor has emerged in the related technologies. For example, a laser sensor (such as lidar), or a depth sensor (such as an RGB-D camera), etc. is used to directly acquire depth information at positions of image pixels, so as to recover three-dimensional point cloud information for visual localization. However, a hardware cost of implementing the solution is increased.

In view of the above problems, the exemplary embodiments of the disclosure provide a visual localization method, which can be applied to scenarios including but being not limited to: indoor navigation, for example indoor navigation for a user in a shopping mall, where an environment image may be captured through a terminal having a photographing function, the terminal extracts feature points from the environment image and uploads them to a cloud server, and the cloud server implements the visual localization method according to the exemplary embodiments, to determine a localization result of the terminal and provide the indoor navigation service.

An electronic device is further provided by the exemplary embodiments of the disclosure, for implementing the above visual localization method. The electronic device may be the above-mentioned terminal or cloud server, including but being not limited to a computer, a smartphone, a wearable device (such as augmented reality glasses), a robot, an unmanned aerial vehicle, and the like. The electronic device generally includes a processor and a memory. The memory is configured to store executable instructions for the processor, and also application data, such as image data and video data. The processor is configured to execute the executable instructions to implement the visual localization method according to the exemplary embodiments.

A mobile terminal 100 in FIG. 1 is taken as an example hereafter, to illustrate the construction of the above electronic device. It can be understood by those skilled in the art that, in addition to components specifically for purposes of mobility, the construction in FIG. 1 is also capable of being applied to stationary devices.

As illustrated in FIG. 1, the mobile terminal 100 may specifically include a processor 110, an internal memory 121, an external memory interface 122, a universal serial bus (USB) interface 130, a charging management module 140, a power management module 141, a battery 142, an antenna 1, an antenna 2, a mobile communication module 150, a wireless communication module 160, an audio module 170, a speaker 171, a receiver 172, a microphone 173, a headphone jack 174, a sensor module 180, a display screen 190, a camera module 191, an indicator 192, a motor 193, a button 194, a subscriber identification module (SIM) card interface 195 and the like.

The processor 110 may include one or more processing units. For example, the processor 210 may include an application processor (AP), a modem processor, a graphics processing unit (GPU), an image signal processor (ISP), a controller, an encoding device, a decoding device, a digital signal processor (DSP), a baseband processor and/or a neural-network processing unit (NPU), etc.

The encoding device may encode (i.e., compress) image data or video data, such as a captured scene image, to form corresponding stream data, thereby reducing a bandwidth occupied by data transmission. The decoding device may decode (i.e., decompress) the stream data of the image or video, to restore the image or the video. For example, the decoding device is configured to decode the stream data of the scene image to obtain complete image data, for the execution of the visual localization method according to the exemplary embodiments. The mobile terminal 100 may support one or more encoding devices and decoding devices. In this way, the mobile terminal 100 may process images or videos in multiple encoding formats, including image formats such as joint photographic experts group (JPEG), portable network graphics (PNG), and bitmap (BMP), and video formats such as moving picture experts group (MPEG) 1, MPEG2, H.263, H.264, and high efficiency video coding (HEVC).

In some implementations, the processor 110 may include one or more interfaces through which the processor may connect with other components of the mobile terminal 100.

The internal memory 121 may be used to store computer-executable program codes including instructions. The internal memory 121 may include a volatile memory and a nonvolatile memory. The processor 110 implements various functional applications and data processing of the mobile terminal 100 by executing the instructions stored in the internal memory 121.

The external memory interface 122 may be configured for connection with an external memory, for example, a micro card, so as to expand a storage capacity of the mobile terminal 100. The external memory is configured to communicate with the processor 110 through the external memory interface 122, to implement a data storage function, such as storing images, videos and other files.

The USB interface 130 is an interface that complies with the USB standard specification. The USB interface 130 may be configured to be connected with a battery charger, so as to charge the mobile terminal 100, or connected with headphones or other electronic devices.

The charging management module 140 is configured to receive charging input from the battery charger. While charging the battery 142, the charging management module 140 may also be configured to supply power to the terminal device through the power management module 141. The power management module 141 may also be configured to monitor a state of the battery.

A wireless communication function of the mobile terminal 100 may be implemented through the antenna 1, the antenna 2, the mobile communication module 150, the wireless communication module 160, the modem processor, the baseband processor, and the like. The antenna 1 and the antenna 2 are configured to transmit and receive electromagnetic wave signals. The mobile communication module 150 may be configured to provide wireless communication solutions, including 2G/3G/4G/5G, that are applied on the mobile terminal 100. The wireless communication module 160 may be configured to provide wireless communication solutions applied on the mobile terminal 100. The wireless communication solutions include wireless local area network (WLAN) such as wireless fidelity (Wi-Fi) network, Bluetooth (BT), global navigation satellite system (GNSS), frequency modulation (FM), near field communication (NFC), infrared (IR), and other wireless communication solutions.

The mobile terminal 100 may enable a display function through the GPU, the display screen 190 and the AP, for displaying a user interface. For example, when the user activates the photographing function, the mobile terminal 100 may display a shooting interface, a preview image, and the like on the display screen 190.

The mobile terminal 100 may implement the photographing function through the ISP, the camera module 191, the encoding device, the decoding device, the GPU, the display screen 190, the AP, etc. For example, a user may trigger the photographing function by activating the services related to visual localization, an image of a current scene may be captured by the camera module 191, and a localization process is performed.

The mobile terminal 100 may implement an audio function through the audio module 170, the speaker 171, the receiver 172, the microphone 173, the headphone jack 174, the AP, etc.

The sensor module 180 may include a depth sensor 1801, a pressure sensor 1802, a gyroscope sensor 1803, a barometric sensor 1804, etc., to implement corresponding sensing functions.

The indicator 192 may be an indicator light. The indicator 192 may be used to indicate a charging state, a change of the power, and may alternatively be used to indicate a message, a missed call, a notification, and the like. The motor 193 may be configured to generate a vibration prompt, and may also be used for tactile vibration feedback and the like. The button 194 includes a power button, a volume button, and the like.

The mobile terminal 100 may support one or more SIM card interfaces 195 for connection with an SIM card, to enable functions such as calling and mobile communication.

The visual localization method according to the exemplary embodiments is described below with reference to FIG. 2. FIG. 2 illustrates an exemplary flow of the visual localization method, and the method includes operations as follows.

At operation S210, surface normal vectors of a current image frame are obtained.

At operation S220, by projecting the surface normal vectors to a Manhattan coordinate system, a first transformation parameter between the current image frame and a reference image frame is determined.

At operation S230, a matching operation is performed between feature points of the current image frame and feature points of the reference image frame, and a second transformation parameter between the current image frame and the reference image frame is determined based on a matching result.

At operation S240, by optimizing the second transformation parameter based on the first transformation parameter, a target transformation parameter is obtained.

At operation S250, based on the target transformation parameter, a visual localization result corresponding to the current image frame is output.

Based on the above method, the first transformation parameter between the current image frame and the reference image frame is determined, based on the projections of the surface normal vectors of the current image frame in the Manhattan coordinate system (Manhattan world). The first transformation parameter is used to optimize the second transformation parameter obtained by feature point matching. The visual localization result is output, based on the target transformation parameter obtained through the optimization. On the one hand, in the exemplary embodiments, the transformation parameter is determined through two aspects, i.e., the projections of the surface normal vectors and the feature point matching, and the visual localization is performed based on the results of the two aspects, which reduces a dependence on each aspect and improves robustness of the solution. In particular, the dependence on the quality of features in the image is reduced. Thus, even in an environment of weak texture, the accuracy of the target transformation parameter and the final visual localization result can be improved through the optimization of the second transformation parameter, so as to address the visual localization in the environment of weak texture. On the other hand, in the exemplary embodiments, the second transformation parameter is determined through the feature point matching, and a low computational complexity is required for the extraction and matching of the feature points, which is conductive to improving a response speed and a real-time performance of the visual localization. In addition, the exemplary embodiments may be implemented based on a common monocular RGB camera without addition of an auxiliary sensor, and there is a low cost for implementation.

Each operation in FIG. 2 is described in detail below.

As illustrated in FIG. 2, at operation S210, the surface normal vectors of the current image frame are obtained.

The current image frame is an image currently captured for a target scene. The target scene is an environmental scene where a user is currently located, such as a room, and a shopping mall. In the scene where visual localization is to be implemented, a terminal usually needs to continuously capture multiple image frames of the scene, and the current image frame is the latest image frame. The surface normal vectors of the current image frame include surface normal vectors of at least part of pixels in the current image frame. For example, if the current image frame has a height of H and a width of W, the quantity of the pixels in the current image frame is H*W. The surface normal vector of each pixel point is obtained. The surface normal vector of each pixel point includes coordinates in 3 dimensions, and the surface normal vectors of the current image frame include H*W*3 values. FIG. 3 is a schematic diagram illustrating a visualization of the surface normal vectors. Image $I_0$ represents the current image frame, and each pixel point in image $I_0$ includes a pixel value (such as a RGB value). After the surface normal vector of each pixel point is acquired, a visualized surface normal vector image $I_{normal}$ is obtained by denoting coordinate values of the surface normal vectors as colors. The pixel points on the same plane in image $I_0$ have a same surface normal vector, and they are denoted as a same color in $I_{normal}$.

In some embodiments, a surface-normal-vector estimation network may be pre-trained, which may be a deep learning network such as a convolutional neural network (CNN). The surface-normal-vector estimation network is used to process the current image frame to obtain the surface normal vectors of the current image frame.

FIG. 4 is a schematic structural diagram of the surface-normal-vector estimation network, which may be modified based on a traditional U-Net (a U-shaped network) structure. The network mainly includes three parts: an encoding sub-network (encoder), a decoding sub-network (decoder), and a convolutional sub-network (convolution). As illustrated in FIG. 5, the process of obtaining the surface normal vectors may include operations as follows.

At operation S510, by down-sampling the current image frame through the encoder, a down-sampled intermediate image and a down-sampled target image are obtained.

At operation S520, an up-sampled target image is obtained, by up-sampling the down-sampled target image and performing a concatenation operation on the down-sampled target image after undergoing the up-sampling and the down-sampled intermediate image, through the decoder.

At operation S530, the surface normal vectors are obtained, by performing a convolution operation on the up-sampled target image through the convolutional sub-network.

Generally, after the current image frame is input into the surface-normal-vector estimation network, the current image frame is first input into the encoder. In the encoder, multiple down-sampling operations are performed sequentially. For example, the down-sampling operations is performed for g times (g≥2), in this case, an image(s) obtained from the first down-sampling operation to the (g−1)th down-sampling operation are taken as the down-sampled intermediate image(s), and an image obtained by the g-th down-sampling operation is taken as the down-sampled target image. Both the down-sampled intermediate image(s) and the down-sampled target image may be taken as the images output by the encoder. The down-sampling operation may capture semantic information in the image.

Next, the down-sampled target image is input into the decoder, and multiple up-sampling operations and concatenation operations are performed in sequence. After each up-sampling operation is performed, the obtained image is combined with a corresponding down-sampled intermediate image to obtain an up-sampled intermediate image, and then the up-sampling and concatenation operations of a next time are performed on the up-sampled intermediate image. The up-sampling operation of the decoder corresponds to the down-sampling operation of the encoder, which may locate the semantic information in the image. After the up-sampling and concatenation operations of the last time are performed, the decoding outputs the up-sampled target image. It is notable that, in the process performed at the decoder, the concatenation operation may also be regarded as an operation included in the up-sampling operation, that is, the up-sampling operation and the concatenation operation mentioned above are collectively called the up-sampling operation, which is not limited in the disclosure.

Finally, the up-sampled target image is input into the convolutional sub-network. The convolutional sub-network may be composed of multiple scale-invariant convolutional layers. The convolutional sub-network performs the convolution operation on the up-sampled target image to further learn image features and improve an image decoding capability, and the surface normal vectors are finally output.

In some embodiments, a process for training the surface-normal-vector estimation network may include operations as follows.

An initial surface-normal-vector estimation network is constructed, and a structure thereof may be a structure illustrated in FIG. 4.

A loss function of the surface-normal-vector estimation network is established as follows:

$$L = \Sigma_{x \in \Omega} \omega(x) \log(p_{l(x)}(x)) \qquad (1)$$

where $p_{l(x)}(x)$ represents an average precision (AP) probability function, $l:\Omega \rightarrow \{1, \ldots, K\}$ represents pixel points, and $\omega:\Omega \in \Re$ represent weight values of the pixel points. The closer a pixel point is to a boundary location in the image, the higher the weight value of the pixel point.

A training scheme of Mini-batch and an Adam algorithm are set, and a training learning rate and a number of training iterations (steps) are configured. For example, the training learning rate and the number of training iterations are 0.001 and 1 million, respectively.

A dataset containing RGB images and surface-normal-vector images, such as Taskonomy and NYUv2, is input to start the training.

After the training is completed and the test is passed, the structure and parameters of the surface-normal-vector estimation network are fixed and saved as a corresponding file for recall.

The processing of the surface-normal-vector estimation network is further illustrated with reference to FIG. 4. The current image frame is input to the network, and the encoder performs 5 down-sampling operations on the current image frame. Each down-sampling operation may include two 3*3 convolutional operations and one 2*2 maximum pooling operation. The quantity of convolution kernels used in the down-sampling operation is successively doubled for the 5 down-sampling operations, for example, the quantities of convolution kernels for the 5 down-sampling operations are respectively 1, 64, 128, 256, 512, and 1024. Each of the down-sampling operations generates a corresponding down-sampled intermediate image, and the sizes of the obtained down-sampled intermediate images are successively decreased. The down-sampled target image is obtained by the last down-sampling operation. The decoder performs, on the down-sampled target image, multiple up-sampling operations corresponding to the down-sampling operations. Each up-sampling operation may include one 2*2 transposed convolution (or deconvolution) operation, one concatenation operation with a corresponding down-sampled immediate image having the same size, and two 3*3 convolution operations. Each up-sampling operation generates a corresponding up-sampled immediate image, and the sizes of the obtained up-sampled immediate images are successively increased. The up-sampled target image is obtained by the last up-sampling operation. Then, the convolutional sub-network performs a full convolutional operation on the up-sampled target image, and finally outputs the surface normal vectors.

As illustrated in FIG. 2, at operation S220, the first transformation parameter between the current image frame and the reference image frame is determined, by projecting the surface normal vectors to the Manhattan coordinate system.

A Manhattan world hypothesis assumes that there is perpendicular or orthogonal information in an environment. For example, in the current image frame $I_0$ illustrated in FIG. 3, an indoor floor is perpendicular to walls, the walls are perpendicular to a ceiling, and the front wall is perpendicular to the walls on both sides, so that a coordinate system containing vertical information, i.e., the Manhattan coordinate system, may be established. The above-mentioned vertical relations between the ground and walls, between the walls and the ceiling, etc., are non-vertical relations in a camera coordinate system or an image coordinate system corresponding to the current image frame. It can be seen that there is a particular transformation relationship between the Manhattan coordinate system and the camera coordinate system or image coordinate system. Therefore, based on transformation parameters between the Manhattan coordinate system and the camera coordinate systems corresponding to different image frames, transformation parameters between the camera coordinate systems corresponding to the different image frames is determined. In the exemplary embodiments, the transformation parameter between the camera coordinate system corresponding to the current image frame and the camera coordinate system corresponding to the reference image frame is determined in this way. The first transformation parameter between the current image frame and the reference image frame refers to the transformation parameter between the camera coordinate systems corresponding to the two images, as determined based on the Manhattan coordinate system. The reference image frame may be any one image frame or multiple image frames that are captured for the target scene and have a known pose. For example, in the case where images of the scene are continuously captured for visual localization, a previous image frame may be taken as the reference image frame.

It is notable that, the transformation parameter described in the exemplary embodiments may include a rotation parameter (e.g., a rotation matrix) and a translation parameter (e.g., a translation vector).

At operation S210, the surface normal vector of each pixel point in the current image frame may be obtained. At operation S220, the surface normal vector of each pixel point may be projected to the Manhattan coordinate system, and a subsequent processing is performed on the projections to obtain the first transformation parameter. Alternatively, the surface normal vectors of a part of the pixel points are projected to the Manhattan coordinate system. For example, pixel points in a low flatness region (which usually refers to a region with large texture variations) in the current image frame are selected, and the surface normal vectors of the selected pixel points are projected to the Manhattan coordinate system.

In some embodiments, as illustrated in FIG. 6, operation S220 may be realized through operations S610 to S630.

At operation S610, the above surface normal vectors are mapped to the Manhattan coordinate system, based on a transformation parameter for transformation from the camera coordinate system corresponding to the reference image frame to the Manhattan coordinate system.

Figure 7:
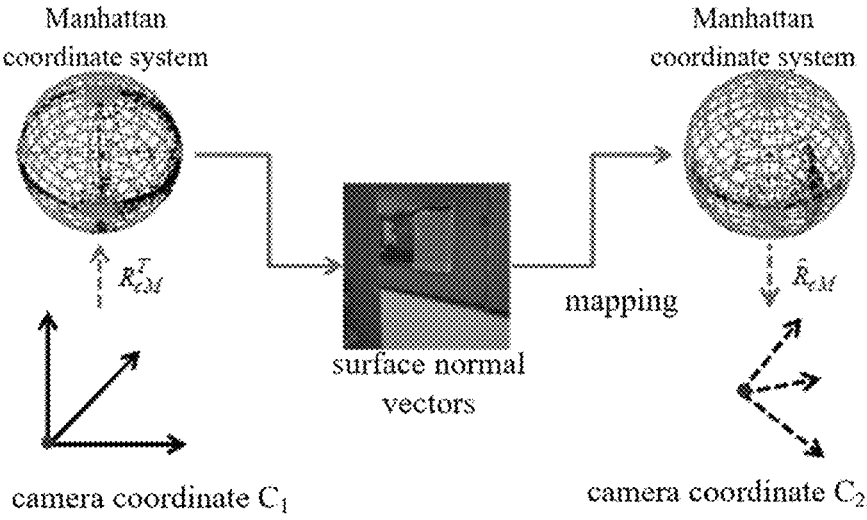
FIG. 7 is a schematic diagram illustrating determination of a transformation parameter for transformation from a camera coordinate system corresponding to the current image frame to a Manhattan coordinate system according to some exemplary embodiments.

Specifically, the camera coordinate system generally refers to a Cartesian coordinate system with an optical center of the camera as an origin, which may be denoted as SO(3). The Manhattan coordinate system generally refers to a vector coordinate system formed by a unit sphere, which may be denoted as so(3). FIG. 7 illustrates a normal vector sphere, where each point on the normal vector sphere represents a position of an end point of a surface normal vector in the camera coordinate system when a starting point of the surface normal vector is moved to the center of the sphere. The surface normal vectors obtained at operation S210 refers to information in the camera coordinate system. Such surface normal vectors may be mapped to the Manhattan coordinate system, based on the transformation parameter for transformation from the camera coordinate system to the Manhattan coordinate system.

Directions of x, y, and z axes in the camera coordinate system are related to the pose of the camera. The directions of x, y, and z axes in the Manhattan coordinate system are determined when the Manhattan coordinate system is established for the target scene, and are related to real world information of the target scene. The directions of the x, y, and z axes in the Manhattan coordinate system are fixed regardless of motion of the camera. Therefore, the transformation relationship between the camera coordinate system and the Manhattan coordinate system includes a rotation transformation relationship between such two coordinate systems. The surface normal vector only represents the direction and is independent of the position of the pixel point. Taking the current image frame $I_0$ illustrated in FIG. 3 as an example, different pixel points on the same wall have the same surface normal vector. Thus, a translation relationship between the camera coordinate system and the Manhattan coordinate system may be ignored. The above transformation parameter for transformation from the camera coordinate system to the Manhattan coordinate system may be a relative rotation matrix for transformation from the camera coordinate system to the Manhattan coordinate system.

In some embodiments, operation S610 may include operations as follows.

Based on the transformation parameter for transformation from the camera coordinate system corresponding to the reference image frame to the Manhattan coordinate system, three-dimensional coordinates of the surface normal vectors in the camera coordinate system corresponding to the reference image frame are mapped into three-dimensional coordinates in the Manhattan coordinate system.

The three-dimensional coordinates of the surface normal vectors in the Manhattan coordinate system are mapped into two-dimensional coordinates on a tangent plane of each axis of the Manhattan coordinate system.

For example, a rotation matrix for transformation from the camera coordinate system corresponding to the reference image frame to the Manhattan coordinate system is represented as $R_{cM}=[r_1 \ r_2 \ r_3]\in SO(3)$, where $r_1$, $r_2$ and $r_3$ respectively represent the three axes of the Manhattan coordinate system. The surface normal vector obtained at operation S210 is represented as $n_k$, and it is mapped to the Manhattan coordinate system to obtain:

$$n'_k = R_{cM}^T \cdot n_k \qquad (2)$$

where $$n'_k$$

represents the three-dimensional coordinates of the surface normal vector $n_k$ in the Manhattan coordinate system.

Then, $n'_k$ is mapped, through logarithm map, to the tangent plane of an axis, such as a tangent plane of the z axis, of the Manhattan coordinate system, to obtain:

$$m'_k = \frac{\sin^{-1}(\lambda)\,\mathrm{sign}\left(n'_{k,z}\right)}{\lambda}\begin{bmatrix} n'_{k,x} \\ n'_{k,y} \end{bmatrix} \qquad (3)$$

where $$\lambda = \sqrt{n'^2_{k,x} + n'^2_{k,y}},$$

$m_k'$ represents the two-dimensional coordinates of the surface normal vector $n_k$ on the tangent plane of the axis of the Manhattan coordinate system. Compared with the three-dimensional coordinates on the unit sphere, it is easier to compute an offset of the surface normal vector by representing the surface normal vector as the two-dimensional coordinates on the tangent plane. The mapping to a tangent plane of the x-axis, and a tangent plane of the y-axis of the Manhattan coordinate system are similar to mapping to the tangent plane of the z-axis.

At operation S620, based on an offset of the surface normal vectors in the Manhattan coordinate system, a transformation parameter for transformation from the camera coordinate system corresponding to the current image frame to the Manhattan coordinate system is determined.

Based on the Manhattan world hypothesis, if the transformation parameter for transformation from the camera coordinate system to the Manhattan coordinate system is accurate, the surface normal vector that has been mapped to the Manhattan coordinate system should be the same as an axis direction of the Manhattan coordinate system. As illustrated in FIG. 7, since the transformation parameter $R_{cM}$ ( $$R_{cM}^T,$$

to be more precise) for transformation from the camera coordinate system corresponding to the reference image frame to the Manhattan coordinate system is used to map the surface normal vector of the current image frame at operation S610, there is an offset between the mapped surface normal vector and the axis of the Manhattan coordinate system, which is expressed by a fact that a mapping point of the surface normal vector on the unit sphere is not located at the axis. It can be seen that the offset is caused by an inconsistency between the transformation parameter $R_{cM}$ for transformation from the camera coordinate system corresponding to the reference image frame to the Manhattan coordinate system and the transformation parameter (which may be represented as $\hat{R}_{cM}$) for transformation from the camera coordinate system corresponding to the current image frame to the Manhattan coordinate system. Thus, the offset of the surface normal vectors may be used to calculate the transformation parameter for transformation from the camera coordinate system corresponding to the current image frame to the Manhattan coordinate system.

In some embodiments, operation S620 may include operations as follows.

A clustering process is performed on the two-dimensional coordinates of the surface normal vectors on the tangent plane, and an offset of the surface normal vectors on the tangent plane is determined based on a cluster center.

Two-dimensional coordinates of the offset on the tangent plane are mapped into three-dimensional coordinates in the Manhattan coordinate system.

The transformation parameter for transformation from the camera coordinate system corresponding to the current image frame to the Manhattan coordinate system is determined, based on the transformation parameter for transformation from the camera coordinate system corresponding to the reference image frame to the Manhattan coordinate system and based on the three-dimensional coordinates of the offset in the Manhattan coordinate system.

When the two-dimensional coordinates of the surface normal vectors are clustered, the clustering process is actually performed on projection points of the surface normal vectors on the tangent plane. The clustering processes may be performed on the coordinates of each dimension. The disclosure does not limit the specific manner of the clustering process.

For example, a traditional Mean-Shift algorithm (which is a clustering algorithm) is used to calculate the cluster center of $m'_k$, to obtain the offset of the cluster center relative to the origin of the tangent plane (in fact, the offset refers to the two-dimensional coordinates of the cluster center), which may be specifically represented as:

$$s'_j = \frac{\sum e^{-c\|m'_k\|^2} m'_k}{\sum e^{-c\|m'_k\|^2}} \qquad (4)$$

where c represents a width of a Gaussian kernel, and $s'_j$ represents the offset of $m'_k$, i.e., the two-dimensional coordinates of the offset on the tangent plane of a j axis, where the j axis includes the x-axis, the y-axis and the z-axis.

The three-dimensional coordinates of the offset are obtained by using exponential mapping to map $s'_j$ from the tangent plane back to the unit sphere of the Manhattan coordinate system, that is:

$$s_j = \left[ \frac{\tan(s'_j)}{\|s'_j\|} s'^T_j \quad 1 \right]^T \qquad (5)$$

where $s_j$ includes coordinates of the x, y, and z axes in the Manhattan coordinate system, which may respectively represent vectors that need to be updated for individual axes of the Manhattan coordinate system. Thus, on the basis of the transformation parameter for transformation from the camera coordinate system corresponding to the reference image frame to the Manhattan coordinate system, the transformation parameter is updated based on the three-dimensional coordinates of the offset $s_j$, to obtain the transformation parameter for transformation from the camera coordinate system corresponding to the current image frame to the Manhattan coordinate system, which is as follows:

$$\begin{cases} \hat{r}_j = R_{cM} s_j \\ \hat{R}_{cM} = [\hat{r}_1 \quad \hat{r}_2 \quad \hat{r}_3] \end{cases} \qquad (6)$$

where $\hat{R}_{cM}$ represents the transformation parameter for transformation from the camera coordinate system corresponding to the current image frame to the Manhattan coordinate system, which mainly includes a relative rotation matrix between the camera coordinate system corresponding to the current image frame and the Manhattan coordinate system.

In some embodiments, a singular value decomposition (SVD) algorithm may be applied to the above relative rotation matrix, $\hat{R}_{cM}$, to enable the rotation matrix to satisfy an orthogonality constraint for application, so as to improve an accuracy of the relative rotation matrix.

At operation S630, the first transformation parameter between the current image frame and the reference image frame is determined, based on the transformation parameter for transformation from the camera coordinate system corresponding to the reference image frame to the Manhattan coordinate system and the transformation parameter for transformation from the camera coordinate system corresponding to the current image frame to the Manhattan coordinate system.

As illustrated in FIG. 7, there is a transformation relationship between the camera coordinate system $c_1$ corresponding to the reference image frame and the Manhattan coordinate system, and there is another transformation relationship between the camera coordinate system $c_2$ corresponding to the current image frame and the Manhattan coordinate system. Thus, the transformation parameter between the current image frame and the reference image frame, i.e., a relative pose relationship between $c_1$ and $c_2$, may be calculated using the Manhattan coordinate system as a datum, which is as follows:

$$R_{1c_2c_1} = \hat{R}_{cM} \cdot R_{cM} \qquad (7)$$

where $c_1$ and $c_2$ represent the camera coordinate system corresponding to the reference image frame and the camera coordinate system corresponding to the current image frame respectively, and $R_{1c_2c_1}$ represents a relative transformation parameter calculated based on the mapping of the surface normal vectors, which is called the first transformation parameter.

As illustrated in FIG. 2, at operation S230, the matching operation is performed between the feature points of the current image frame and the feature points of the reference image frame, and the second transformation parameter between the current image frame and the reference image frame is determined based on the matching result.

The feature points refer to representative points for a local part of the image, and may reflect local features of the image. The feature points are generally extracted from a boundary region having a rich texture, and described in a particular way to obtain feature point descriptors. In the exemplary embodiments, the feature points may be extracted and described with an algorithm, such as features from accelerated segment test (FAST), binary robust independent elementary features (BRIEF), oriented FAST and rotated BRIEF (ORB), scale-invariant feature transform (SIFT), speeded up robust features (SURF), SuperPoint (feature point detection and descriptor extraction based on self-supervised learning), and reliable and repeatable detector and descriptor (R2D2).

It is illustrated by taking an SIFT feature as an example. The SIFT feature is obtained by describing a feature point detected from the image with a 128-dimensional feature vector. The SIFT feature has a property of being invariant to image scaling, translation and rotation, and is also invariant to illumination, affine and projection transformation to a certain extend. The feature points are extracted from the reference image frame and the current image frame, and represented as the SIFT features. The matching operation is performed between the SIFT features of the reference image frame and the current image frame. Generally, a similarity of the SIFT feature vectors of two feature points may be calculated, for example, the similarity is measured by Euclidean distance, cosine similarity, etc. When the similarity is high, it indicates that the two feature points match each other, and a matching point pair is defined by the two feature points. A set containing the matching point pairs of the reference image frame and the current image frame is taken as the above matching result.

Figure 8:
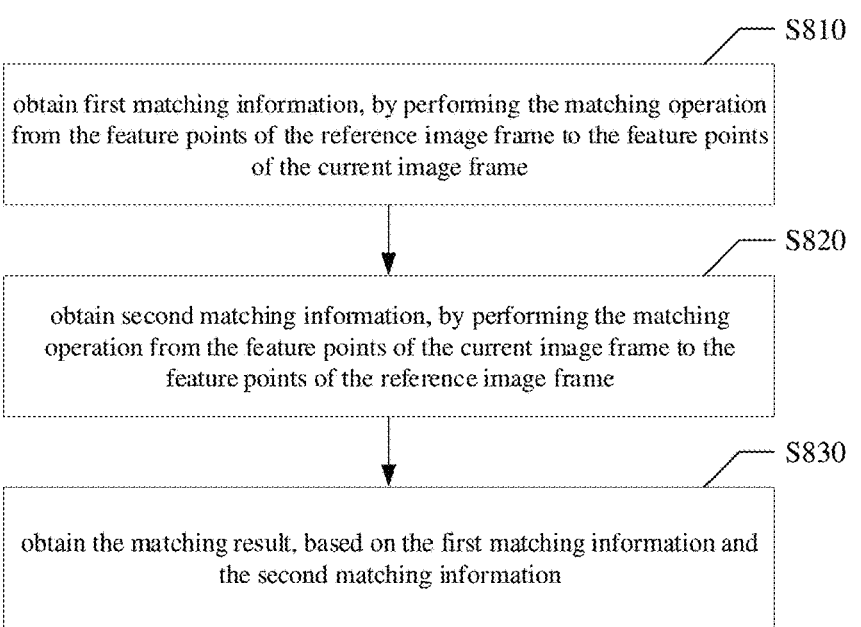
FIG. 8 is a schematic flowchart of performing a matching operation on feature points according to some exemplary embodiments.

In some embodiments, as illustrated in FIG. 8, operation S230 may include operations as follows.

At operation S810, first matching information is obtained, by performing the matching operation from the feature points of the reference image frame to the feature points of the current image frame.

At operation S820, second matching information is obtained, by performing the matching operation from the feature points of the current image frame to the feature points of the reference image frame.

At operation S830, the matching result is obtained, based on the first matching information and the second matching information.

For example, M feature points are extracted from the reference image frame $c_1$, and each feature point is described by a d-dimensional (for example, 128 dimensional) descriptor; accordingly, a local descriptor of the reference image frame is denoted as $D_{M*d}$. N feature points are extracted from the current image frame $c_2$, and each feature point is described by a d-dimensional descriptor; accordingly, a local descriptor of the reference image frame is denoted as $D_{N*d}$. The matching operation is performed from $D_{M*d}$ to $D_{N*d}$ to obtain the first matching information, which is as follows:

$$S^1_{M*N} = \mathrm{argmax}\left[1 - 2*\left(D_{M*d}*D^T_{N*d}\right)\right] \qquad (8)$$

The matching operation is performed from $D_{N*d}$ to $D_{M*d}$ to obtain the second matching information, which is as follows:

$$S^2_{N*M} = \mathrm{argmax}\left[1 - 2*\left(D_{N*d}*D^T_{M*d}\right)\right] \qquad (9)$$

At operation S810 and operation S820, matching directions are different, and the obtained matching results are different accordingly. The obtained matching results are respectively represented as the first matching information $$S^1_{M*N}$$

and the second matching information $$S^2_{N*M} \cdot S^1_{M*N}$$

and $$S^2_{N*M}$$

may be respectively a M*N matrix and a N*M matrix, representing matching probabilities of the feature points in the different matching directions.

Furthermore, a final matching result may be obtained by synthesizing the first matching information and the second matching information.

In some embodiments, an intersection of the first matching information and the second matching information may be acquired as the matching result. For example, first matching probabilities of various feature point pairs are determined in the first matching information, and second matching probabilities of the various feature point pairs are determined in the second matching information. For the same feature point pair, a smaller value of the first matching probability and the second matching probability is taken as a synthetic matching probability. The matching result is obtained by selecting feature point pairs each of which has a synthetic matching probability greater than a preset matching threshold. Alternatively, feature point pairs whose matching probabilities are greater than a matching threshold are selected from the first matching information, to obtain a first set of the matching point pairs. Feature point pairs whose matching probabilities are greater than the matching threshold are selected from the second matching information, to obtain a second set of the matching point pairs. An intersection of the first set of the matching point pairs and the second set of the matching point pairs is acquired as the matching result. A cross-check matching is realized by taking the intersection, which ensures the quality of the matching point pairs.

In other embodiments, a union of the first matching information and the second matching information may be obtained as the matching result. Different from the above manner in which the intersection is obtained as the matching inform, the larger one of the first match probability and the second match probability is taken as the synthetic matching probability, or a union of the first set of the matching point pairs and the second set of the matching point pairs is acquired.

In some embodiments, after the matching point pairs of the reference image frame and the current image frame are determined, false matching point pairs of the reference image frame and the current image frame may be removed from the matching result, through an algorithm such as random sample consensus (RANSAC), and based on a geometric constraint, e.g., epipolar constraint, on the images. In this way, an accuracy of the feature point matching and an accuracy of a subsequent processing result are improved.

Figure 9:
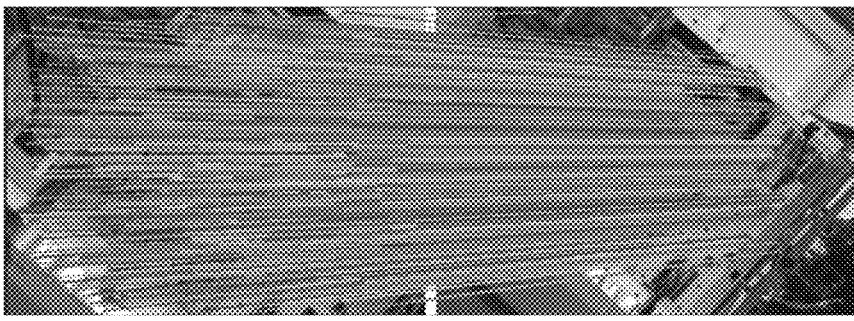
FIG. 9 is another schematic diagram illustrating matching between feature points according to some exemplary embodiments.

FIG. 9 illustrates a matching relationship of the feature points between the reference image frame and the current image frame. Based on the matching relationship of the feature points, a SVD algorithm may be used to calculate the second transformation parameter between the reference image frame and the current image frame, in which the second transformation parameter may include a rotation matrix $R_{2c_2c_1}$ and a translation vector $T_{2c_2c_1}=(t_1, t_2, t_3)$.

As illustrated in FIG. 2, at operation S240, the target transformation parameter is obtained based on the first transformation parameter and the second transformation parameter.

It can be seen from the above that the first transformation parameter is determined based on the projections of the surface normal vectors, and the second transformation parameter is determined based on the feature point matching. There may be certain limitations on both of the algorithms. In the exemplary embodiments, the first transformation parameter and the second transformation parameter are combined to obtain the more accurate target transformation parameter. For example, one of the first transformation parameter and the second transformation parameter is optimized based on the other, and the target transformation parameter is obtained after the optimization.

In some embodiments, the first transformation parameter includes a first rotation matrix, and the second transformation parameter includes a second rotation matrix. Any one of the first rotation matrix and the second rotation matrix may be optimized using a bundle adjustment (BA) algorithm. Specifically, operation S240 may include operations as follows.

A loss function is established, based on a deviation between the first rotation matrix and the second rotation matrix.

The second rotation matrix is iteratively adjusted to reduce a value of the loss function until the loss function converges. The value of the loss function reaches a minimum value, when the loss function converges. The adjusted second rotation matrix is taken as the rotation matrix of the target transformation parameter.

An exemplary loss function for optimizing the rotation matrix may be as follows:

$$\alpha = a\,\cos((\mathrm{trace}(R_{2c_2c_1} \circ R_{1c_2c_1})-1)/2) \qquad (10)$$

where the second rotation matrix $R_{2c_2c_1}$ is a value that is to be optimized. $R_{2c_2c_1}$ is iteratively adjusted to reduce the value of the loss function $\alpha$, until the loss function converges. The adjusted $R_{2c_2c_1}$ is denoted as $R_{c_2c_1}$, and $R_{c_2c_1}$ represents the rotation matrix in the target transformation parameter. In addition, the translation vector $T_{c_2c_1}$ in the target transformation parameter may assume the translation vector $T_{2c_2c_1}=(t_1, t_2, t_3)$ in the second transformation parameter. As such, the target transformation parameter including $R_{c_2c_1}$ and $T_{2c_2c_1}$ is obtained.

As illustrated in FIG. 2, at operation S250, the visual localization result corresponding to the current image frame is output, based on the target transformation parameter.

The target transformation parameter is used to represent a relative pose relationship between the current image frame and the reference image frame. Generally, when a pose of the reference image frame is determined, on the basis of the pose of the reference image frame, an affine transformation is performed with the target transformation parameter to obtain the visual localization result corresponding to the current image frame. For example, the visual localization result may be a pose with 6 degrees of freedom (DOF).

In some embodiments, as illustrated in FIG. 10, operation S250 may include operations as follows.

At operation S1010, based on the target transformation parameter and a pose corresponding to the reference image frame, a first pose corresponding to the current image frame is determined.

At operation S1020, by projecting, based on the first pose, a three-dimensional point cloud of the target scene to a plane of the current image frame, corresponding projection points are obtained.

At operation S1030, a matching operation is performed between the feature points of the current image frame and the projection points, and a second pose corresponding to the current image frame is determined based on matching point pairs of the feature points of the current image frame and the projection points.

At operation S1040, the second pose is output as the visual localization result corresponding to the current image frame.

The first pose and the second pose respectively refer to the poses of the current image frame that are determined in different ways. After the target transformation parameter is determined, the affine transformation is performed based on the pose of the reference image frame to obtain the first pose. In the exemplary embodiments, an optimization is further performed on the first pose to obtain a more accurate second pose, and the second pose is output as the final visual localization result.

The target scene is a scene for which the current image frame and the reference image frame are captured, which is also the scene where the device to be localized is currently located. FIG. 11 is a schematic diagram illustrating projections of the three-dimensional point cloud onto the plane of the current image frame. By projecting the three-dimensional point cloud from a world coordinate system to the camera coordinate system or the image coordinate system corresponding to the current image frame, the corresponding projection points, i.e., the projection points corresponding to the target scene, are obtained. The matching point pairs are obtained by performing the matching operation between the feature points of the current image frame and projection points. In the exemplary embodiments, the projection points may be described in the same way as the feature points. For example, both of the feature points and the projection points are described with the SIFT feature, so that the matching operation between the feature points and the projection points may be performed by calculating a similarity between SIFT feature vectors of the feature points and SIFT feature vectors of the projection points.

In some embodiments, as illustrated in FIG. 12, the performing the matching operation between the feature points of the current image frame and projection points may include operations as follows.

At operation S1210, third matching information is obtained by performing the matching operation from the projection points to the feature points of the current image frame.

At operation S1220, fourth matching information is obtained by performing the matching operation from the feature points of the current image frame to the projection points.

At operation S1230, based on the third matching information and the fourth matching information, matching point pairs of the feature points of the current image frame and the projection points are obtained.

After the matching point pairs of the projection points and the feature points of the current image frame are obtained, a matching relationship between the feature points of the current image frame (two-dimensional points) and three-dimensional points is obtained, by replacing the projection points in the matching point pairs with the points in the three-dimensional point cloud. Furthermore, the second pose is obtained with an algorithm such as perspective-n-point (PnP which is an algorithm for solving a pose based on a 2D-3D matching relationship).

It is notable that the visual localization method illustrated in FIG. 2 can be applied to a scene of simultaneous localization and mapping (SLAM), and can also be applied to a scene in which the visual localization is performed when a map has been constructed. The process of the visual localization is further illustrated by taking a case where the visual localization is performed when the map has been constructed as an example.

In a map construction process, a staff uses an image acquisition device, such as a mobile phone or panoramic camera, to capture images of a target scene, and the map formed by a 3D point cloud is constructed through a structure from motion (SFM) process, which is illustrated in FIG. 13.

Assuming that a user is located at a certain location in the target scene, and takes the mobile phone to continuously capture multiple image frames of a surrounding environment, and the visual localization is performed at the same time. The process is as follows.

1. Initialization of the Visual Localization

Figure 14:
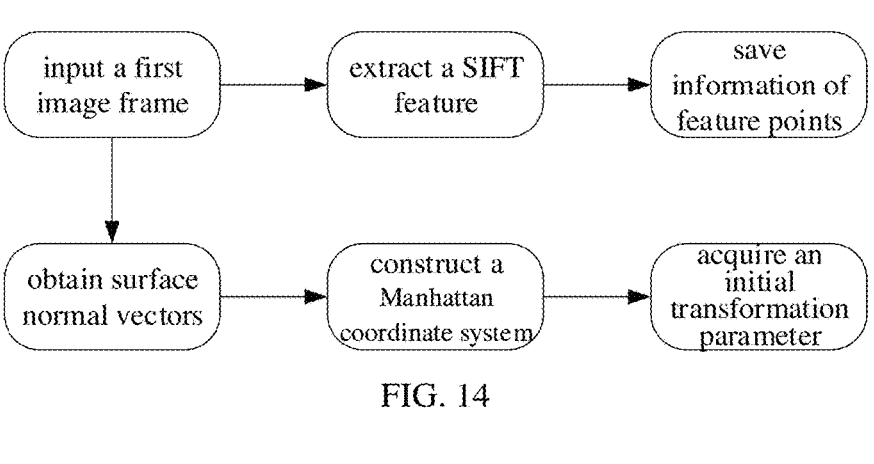
FIG. 14 is a schematic flowchart of initialization of visual localization according to some exemplary embodiments.

FIG. 14 is a schematic flowchart of initialization of the visual localization. A first image frame is input. On the one hand, surface normal vectors are obtained and a Manhattan coordinate system is constructed. Generally, the Manhattan coordinate system may be constructed with the same origin and the same axis directions as the camera coordinate system corresponding to the first image frame. Accordingly, an initial transformation parameter for transformation from the camera coordinate system to the Manhattan coordinate system is acquired, in which the rotation matrix $R_{c1M}$ may be a unit matrix and the translation vector $T_{c1M}$ may be a zero vector. On the other hand, feature points are extracted from the first image frame and described with SIFT feature. The locations and descriptors of the feature points are saved for processing subsequent image frames. The initialization of the visual localization is completed.

2. Determination of a Target Transformation Parameter

Figure 15:
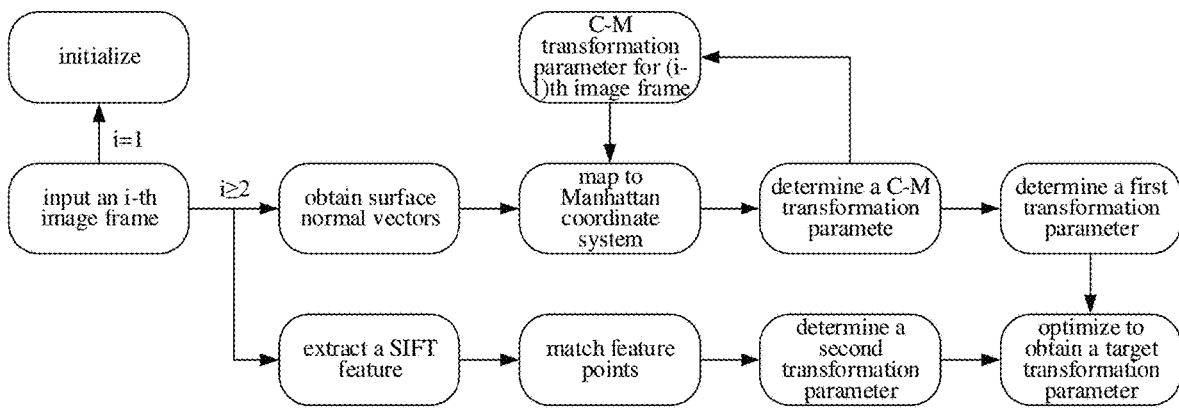
FIG. 15 is a schematic flowchart of determining a target transformation parameter of an i-th frame according to some exemplary embodiments.
Figure 16:
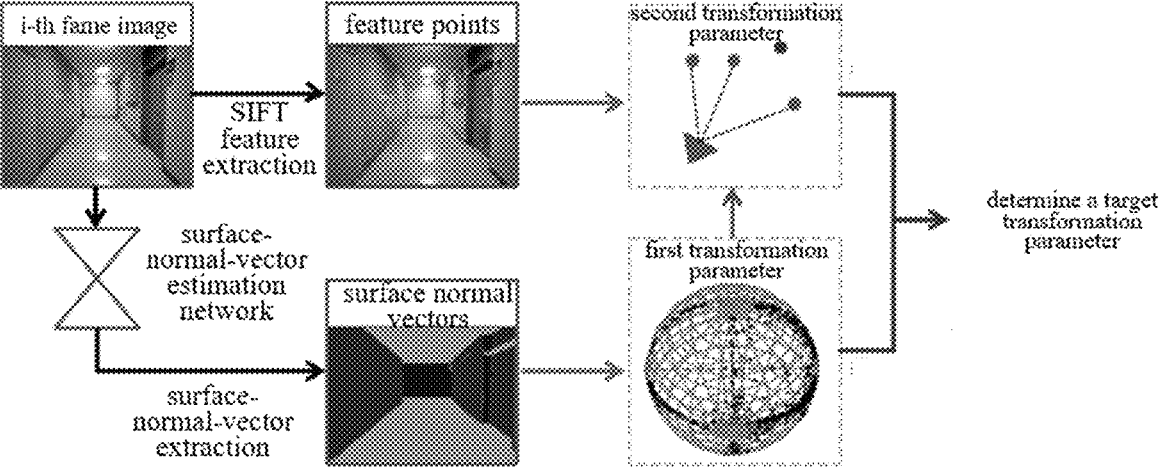
FIG. 16 is a schematic diagram illustrating the determination of the target transformation parameter of the i-th frame according to some exemplary embodiments.

FIG. 15 is a schematic flowchart of processing an i-th image frame, and FIG. 16 is a schematic diagram illustrating the processing the i-th image frame. As illustrated in FIG. 15 and FIG. 16, the i-th fame image is input. When i is greater than or equal to 2, the surface normal vectors are obtained. An (i−1)-th image frame is taken as a reference image frame, and a transformation parameter (which is also referred to as a C-M transformation parameter) for transformation from a camera coordinate system corresponding to the (i−1)-th image frame to the Manhattan coordinate system is acquired. This transformation parameter is used to map the surface normal vectors of the i-th image frame to the Manhattan coordinate system, and an offset is calculated by clustering, to obtain the C-M transformation parameter corresponding to the i-th frame. Furthermore, a first transformation parameter between the i-th image frame and the (i−1)-th image frame is calculated. Feature points are extracted from the i-th image frame and described with SIFT feature, and a matching operation is performed with the feature points of the (i−1)-th image frame, to obtain a second transformation parameter between the i-th image frame and the (i−1)-th image frame. The second transformation parameter is optimized based on the first transformation parameter, to obtain a target transformation parameter.

3. Output of a Visual Localization Result

Based on a pose of the (i−1)-th image frame, a first pose of the i-th image frame is output. A reprojection is performed on the 3D point cloud of the target scene based on the first pose, to obtain corresponding projection points. Based on SIFT features of the projection points and SIFT features of the i-th image frame, matching point pairs of the projection points and the feature points are obtained. A PnP algorithm is solved based on the matching point pairs to output a second pose of the i-th image frame, i.e., a final visual localization result. Based on the visual localization result for each frame, a movement trajectory of the device to be localized can be obtained, thereby realizing real-time indoor navigation or other functions.

Figure 17:
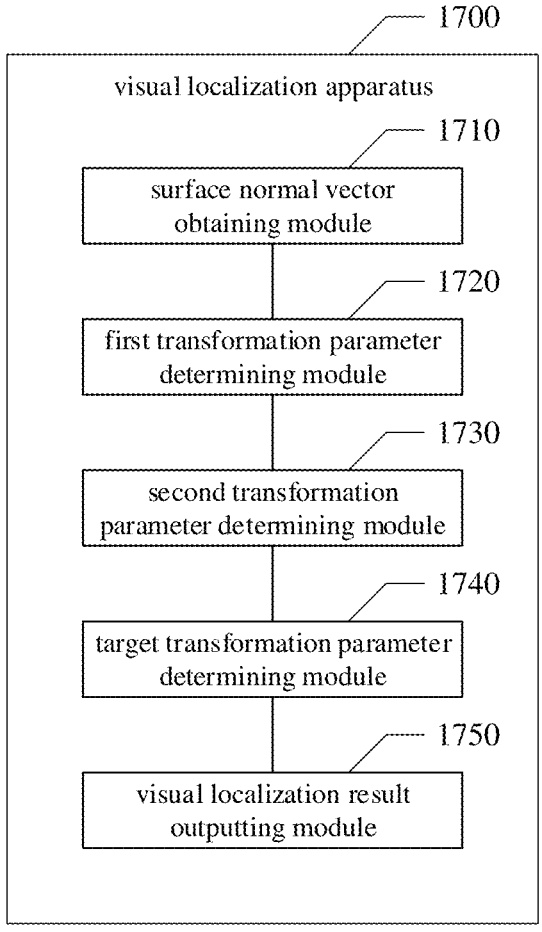
FIG. 17 is a schematic structural diagram of a visual localization apparatus according to some exemplary embodiments.

The exemplary embodiments of the disclosure further provide a visual localization apparatus. As illustrated in FIG. 17, the visual localization apparatus 1700 may include:

a surface normal vector obtaining module 1710, configured to obtain surface normal vectors of a current image frame;

a first transformation parameter determining module 1720, configured to determine a first transformation parameter between the current image frame and a reference image frame, by projecting the surface normal vectors to a Manhattan coordinate system;

a second transformation parameter determining module 1730, configured to perform a matching operation between feature points of the current image frame and feature points of the reference image frame, and determine, based on a matching result, a second transformation parameter between the current image frame and the reference image frame;

a target transformation parameter determining module 1740, configured to obtain a target transformation parameter, based on the first transformation parameter and the second transformation parameter; and a visual localization result outputting module 1750, configured to output, based on the target transformation parameter, a visual localization result corresponding to the current image frame.

In some embodiments, the surface normal vector obtaining module 1710 is further configured to:

obtain the surface normal vectors of the current image frame, by processing the current image frame through a trained surface-normal-vector estimation network.

In some embodiments, the surface-normal-vector estimation network includes an encoding sub-network, a decoding sub-network and a convolutional sub-network. The surface normal vector obtaining module 1710 is further configured to:

obtain a down-sampled intermediate image and a down-sampled target image, by down-sampling the current image frame through the encoding sub-network;

obtain an up-sampled target image, by up-sampling the down-sampled target image and performing a concatenation operation on the down-sampled target image after undergoing the up-sampling and the down-sampled intermediate image, through the decoding sub-network; and obtain the surface normal vectors, by performing a convolution operation on the up-sampled target image through the convolutional sub-network.

In some embodiments, the first transformation parameter determining module 1720 is further configured to:

map, based on a transformation parameter for transformation from a camera coordinate system corresponding to the reference image frame to the Manhattan coordinate system, the surface normal vectors to the Manhattan coordinate system;

determine, based on an offset of the surface normal vectors in the Manhattan coordinate system, a transformation parameter for transformation from the camera coordinate system corresponding to the current image frame to the Manhattan coordinate system; and determine the first transformation parameter between the current image frame and the reference image frame, based on the transformation parameter for transformation from the camera coordinate system corresponding to the reference image frame to the Manhattan coordinate system and the transformation parameter for transformation from the camera coordinate system corresponding to the current image frame to the Manhattan coordinate system.

In some embodiments, the first transformation parameter determining module 1720 is further configured to:

map, based on the transformation parameter for transformation from the camera coordinate system corresponding to the reference image frame to the Manhattan coordinate system, three-dimensional coordinates of the surface normal vectors in the camera coordinate system corresponding to the reference image frame to three-dimensional coordinates in the Manhattan coordinate system; and map the three-dimensional coordinates of the surface normal vectors in the Manhattan coordinate system to two-dimensional coordinates on a tangent plane of each axis of the Manhattan coordinate system.

In some embodiments, the first transformation parameter determining module 1720 is further configured to:

cluster the two-dimensional coordinates of the surface normal vectors on the tangent plane, and determine, based on a cluster center, an offset of the surface normal vectors on the tangent plane;

map two-dimensional coordinates of the offset on the tangent plane into three-dimensional coordinates in the Manhattan coordinate system; and determine the transformation parameter for transformation from the camera coordinate system corresponding to the current image frame to the Manhattan coordinate system, based on the transformation parameter for transformation from the camera coordinate system corresponding to the reference image frame to the Manhattan coordinate system and the three-dimensional coordinates of the offset in the Manhattan coordinate system.

In some embodiments, the mapping two-dimensional coordinates of the offset on the tangent plane into the three-dimensional coordinates in the Manhattan coordinate system, includes:

obtaining the three-dimensional coordinates of the offset in the Manhattan coordinate system, by mapping the two-dimensional coordinates of the offset on the tangent plane to a unit sphere of the Manhattan coordinate system through exponent mapping.

In some embodiments, the transformation parameter for transformation from the camera coordinate system corresponding to the reference image frame to the Manhattan coordinate system includes: a relative rotation matrix between the camera coordinate system corresponding to the reference image frame and the Manhattan coordinate system.

In some embodiments, the second transformation parameter determining module 1730 is further configured to:

obtain first matching information, by performing the matching operation from the feature points of the reference image frame to the feature points of the current image frame;

obtain second matching information, by performing the matching operation from the feature points of the current image frame to the feature points of the reference image frame; and obtain the matching result, based on the first matching information and the second matching information.

In some embodiments, the second transformation parameter determining module 1730 is further configured to:

take, as the matching result, an intersection or a union of the first matching information and the second matching information.

In some embodiments, the performing the matching operation between the feature points of the current image frame and the feature points of the reference image frame, further includes:

removing, based on a geometric constraint on the current image frame and the reference image frame, false matching point pairs from the matching result.

In some embodiments, the first transformation parameter includes a first rotation matrix, and the second transformation parameter includes a second rotation matrix. In some embodiments, the target transformation parameter determining module 1740 is further configured to:

establish a loss function, based on a deviation between first rotation matrix and the second rotation matrix.

adjust the second rotation matrix iteratively to optimize a minimum value of the loss function, and determine the adjusted second rotation matrix as a rotation matrix of the target transformation parameter.

In some embodiments, the visual localization result outputting module 1750 is further configured to:

determine a first pose corresponding to the current image frame, based on the target transformation parameter and a pose corresponding to the reference image frame;

project, based on the first pose, a three-dimensional point cloud of a target scene to a plane of the current image frame, and obtain corresponding projection points, where the target scene is a scene for which the current image frame and the reference image frame are captured;

perform a matching operation between the feature points of the current image frame and the projection points, and determine, based on matching point pairs of the feature points of the current image frame and the projection points, a second pose corresponding to the current image frame; and output the second pose as the visual localization result corresponding to the current image frame.

In some embodiments, the visual localization result outputting module 1750 is further configured to:

obtain third matching information, by performing the matching operation from the projection points to the feature points of the current image frame;

obtain fourth matching information, by performing the matching operation from the feature points of the current image frame to the projection points; and obtain, based on the third matching information and the fourth matching information, matching point pairs of the feature points of the current image frame and the projection points.

In some embodiments, the determining, based on matching point pairs of the feature points of the current image frame and the projection points, a second pose of the current image frame, includes:

obtaining, by replacing the projection points in the matching point pairs with three-dimensional points in the three-dimensional point cloud, a matching relationship between the feature points of the current image frame and the three-dimensional points, and solving the second pose based on the matching relationship.

In some embodiments, the obtaining surface normal vectors of a current image frame, includes:

obtaining the surface normal vector of each pixel point in the current image frame.

In some embodiments, the determining a first transformation parameter between the current image frame and a reference image frame by projecting the surface normal vectors to a Manhattan coordinate system, includes:

determining the first transformation parameter between the current image frame and the reference image frame, by projecting the surface normal vector of each pixel point to the Manhattan coordinate system.

Figure 18:
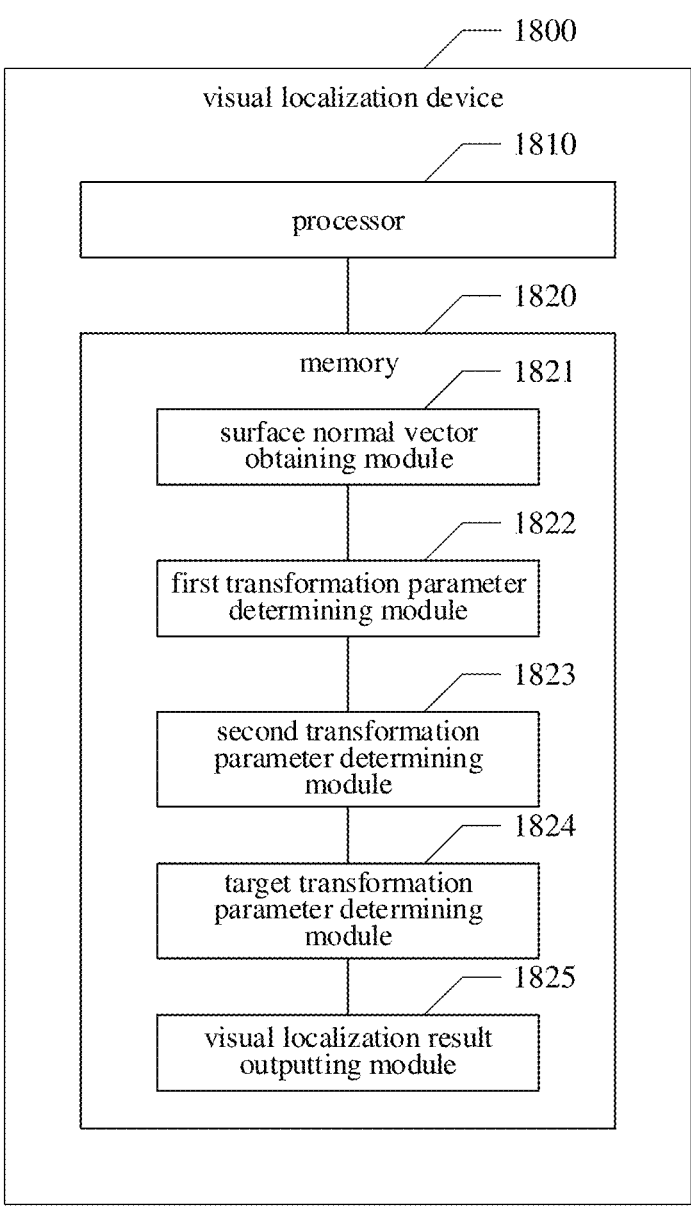
FIG. 18 is another schematic structural diagram of the visual localization device according to some exemplary embodiments.

The exemplary embodiments of the disclosure further provide another visual localization device. As illustrated in FIG. 18, the visual localization device may include a processor 1810 and a memory 1820. The memory 1820 is configured to store program modules as follows:

a surface normal vector obtaining module 1821, configured to obtain surface normal vectors of a current image frame;

a first transformation parameter determining module 1822, configured to determine a first transformation parameter between the current image frame and a reference image frame, by projecting the surface normal vectors to a Manhattan coordinate system;

a second transformation parameter determining module 1823, configured to perform a matching operation between feature points of the current image frame and feature points of the reference image frame, and determine, based on a matching result, a second transformation parameter between the current image frame and the reference image frame;

a target transformation parameter determining module 1824, configured to obtain a target transformation parameter, based on the first transformation parameter and the second transformation parameter; and a visual localization result outputting module 1825, configured to output, based on the target transformation parameter, a visual localization result corresponding to the current image frame.

The processor 1810 is configured to execute the above program modules.

In some embodiments, the surface normal vector obtaining module 1821 is further configured to:

obtain the surface normal vectors of the current image frame, by processing the current image frame through a trained surface-normal-vector estimation network.

In some embodiments, the surface-normal-vector estimation network includes an encoding sub-network, a decoding sub-network and a convolutional sub-network. The surface normal vector obtaining module 1821 is further configured to:

obtain a down-sampled intermediate image and a down-sampled target image, by down-sampling the current image frame through the encoding sub-network;

obtain an up-sampled target image, by up-sampling the down-sampled target image and performing a concatenation operation on the down-sampled target image after undergoing the up-sampling and the down-sampled intermediate image, through the decoding sub-network; and obtain the surface normal vectors, by performing a convolution operation on the up-sampled target image through the convolutional sub-network.

In some embodiments, the first transformation parameter determining module 1822 is further configured to:

map, based on a transformation parameter for transformation from a camera coordinate system corresponding to the reference image frame to the Manhattan coordinate system, the surface normal vectors to the Manhattan coordinate system;

determine, based on an offset of the surface normal vectors in the Manhattan coordinate system, a transformation parameter for transformation from the camera coordinate system corresponding to the current image frame to the Manhattan coordinate system; and determine the first transformation parameter between the current image frame and the reference image frame, based on the transformation parameter for transformation from the camera coordinate system corresponding to the reference image frame to the Manhattan coordinate system and the transformation parameter for transformation from the camera coordinate system corresponding to the current image frame to the Manhattan coordinate system.

In some embodiments, the first transformation parameter determining module 1822 is further configured to:

map, based on the transformation parameter for transformation from the camera coordinate system corresponding to the reference image frame to the Manhattan coordinate system, three-dimensional coordinates of the surface normal vectors in the camera coordinate system corresponding to the reference image frame to three-dimensional coordinates in the Manhattan coordinate system; and map the three-dimensional coordinates of the surface normal vectors in the Manhattan coordinate system to two-dimensional coordinates on a tangent plane of each axis of the Manhattan coordinate system.

In some embodiments, the first transformation parameter determining module 1822 is further configured to:

cluster the two-dimensional coordinates of the surface normal vectors on the tangent plane, and determine, based on a cluster center, an offset of the surface normal vectors on the tangent plane;

map two-dimensional coordinates of the offset on the tangent plane into three-dimensional coordinates in the Manhattan coordinate system; and determine the transformation parameter for transformation from the camera coordinate system corresponding to the current image frame to the Manhattan coordinate system, based on the transformation parameter for transformation from the camera coordinate system corresponding to the reference image frame to the Manhattan coordinate system and the three-dimensional coordinates of the offset in the Manhattan coordinate system.

In some embodiments, the mapping two-dimensional coordinates of the offset on the tangent plane into the three-dimensional coordinates in the Manhattan coordinate system, includes:

obtaining the three-dimensional coordinates of the offset in the Manhattan coordinate system, by mapping the two-dimensional coordinates of the offset on the tangent plane to a unit sphere of the Manhattan coordinate system through exponential mapping.

In some embodiments, the transformation parameter for transformation from the camera coordinate system corresponding to the reference image frame to the Manhattan coordinate system includes: a relative rotation matrix between the camera coordinate system corresponding to the reference image frame and the Manhattan coordinate system.

In some embodiments, the second transformation parameter determining module 1823 is further configured to:

obtain first matching information, by performing the matching operation from the feature points of the reference image frame to the feature points of the current image frame;

obtain second matching information, by performing the matching operation from the feature points of the current image frame to the feature points of the reference image frame; and obtain the matching result, based on the first matching information and the second matching information.

In some embodiments, the second transformation parameter determining module 1823 is further configured to:

take, as the matching result, an intersection or a union of the first matching information and the second matching information.

In some embodiments, the performing the matching operation between the feature points of the current image frame and the feature points of the reference image frame, further includes:

removing, based on a geometric constraint on the current image frame and the reference image frame, false matching point pairs from the matching result.

In some embodiments, the first transformation parameter includes a first rotation matrix, and the second transformation parameter includes a second rotation matrix. In some embodiments, the target transformation parameter determining module 1824 is further configured to:

establish a loss function, based on a deviation between first rotation matrix and the second rotation matrix.

adjust the second rotation matrix iteratively to optimize a minimum value of the loss function, and determine the adjusted second rotation matrix as a rotation matrix of the target transformation parameter.

In some embodiments, the visual localization result outputting module 1825 is further configured to:

determine a first pose corresponding to the current image frame, based on the target transformation parameter and a pose corresponding to the reference image frame;

project, based on the first pose, a three-dimensional point cloud of a target scene to a plane of the current image frame, and obtain corresponding projection points, where the target scene is a scene for which the current image frame and the reference image frame are captured;

perform a matching operation between the feature points of the current image frame and the projection points, and determine, based on matching point pairs of the feature points of the current image frame and the projection points, a second pose corresponding to the current image frame; and output the second pose as the visual localization result corresponding to the current image frame.

In some embodiments, the visual localization result outputting module 1825 is further configured to:

obtain third matching information, by performing the matching operation from the projection points to the feature points of the current image frame;

obtain fourth matching information, by performing the matching operation from the feature points of the current image frame to the projection points; and obtain, based on the third matching information and the fourth matching information, matching point pairs of the feature points of the current image frame and the projection points.

In some embodiments, the determining, based on matching point pairs of the feature points of the current image frame and the projection points, a second pose of the current image frame, includes:

obtaining, by replacing the projection points in the matching point pairs with three-dimensional points in the three-dimensional point cloud, a matching relationship between the feature points of the current image frame and the three-dimensional points, and solving the second pose based on the matching relationship.

In some embodiments, the obtaining surface normal vectors of a current image frame, includes:

obtaining the surface normal vector of each pixel point in the current image frame.

In some embodiments, the determining a first transformation parameter between the current image frame and a reference image frame by projecting the surface normal vectors to a Manhattan coordinate system, includes:

determining the first transformation parameter between the current image frame and the reference image frame, by projecting the surface normal vector of each pixel point to the Manhattan coordinate system.

Details of each part in the above-mentioned apparatus and device have been described in detail in the method embodiments, and the details will not be repeated.

The exemplary embodiments of the disclosure further provide a computer-readable storage medium that can be implemented in a form of a program product including program codes. When the program product is run on the electronic device, the program codes are configured to cause the electronic device to implement the operations of the various exemplary embodiments of the disclosure described in the "exemplary method" of the specification. In some embodiments, the program product may be implemented as a portable compact disk read-only memory (CD-ROM) and include program codes. The program product may be executed on the electronic device, such as a personal computer. However, the program product is not limited thereto. In the context of the disclosure, the computer-readable storage medium may be any tangible medium that contains or stores a program for use by or in connection with an instruction execution system, apparatus, or device.

The program product may utilize any combination of one or more computer-readable mediums. The computer-readable medium may be a computer-readable signal medium or a computer-readable storage medium. The readable storage medium may be, for example, but not limited to, an electronic, magnetic, optical, electromagnetic, infrared or semiconductor system, apparatus, or device, or any suitable combination of the foregoing. More specific examples (a non-exhaustive list) of the readable storage medium include: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

The computer-readable signal medium may include a data signal in baseband or a data signal propagated as part of a carrier wave, in which a readable program code is carried. Such propagated data signal may take various forms, including but not limited to an electromagnetic signal, an optical signal, or any suitable combination thereof. The readable signal medium may alternatively be any readable medium other than a readable storage medium. The readable medium may send, propagate, or transmit a program for use by, or in connection with, an instruction execution system, apparatus, or device.

The program codes embodied on the readable medium may be transmitted using any suitable medium, including but not limited to wireless, wireline, optical fiber cable, RF, etc., or any suitable combination of the foregoing.

The program codes for performing the operations of the disclosure may be written in any combination of one or more programming languages, which include object-oriented programming languages, such as Java, C++, etc., and also include conventional procedural programming language, for example, C programming language. The program codes may be executed entirely on a user computing device, partly on the user device, executed as an independent software package, executed partly on a user computing device and partly on a remote computing device, or executed entirely on a remote computing device or a server. In the case where a remote computing device is involved, the remote computing device may be connected with a user computing device through any kind of network, including a local area network (LAN) or a wide area network (WAN), or the remote computing device may be connected with an external computing device (for example, using an Internet service provider to connect through the Internet).

It is notable that although several modules or units of apparatus for executing functions are described above, such division of modules or units is not mandatory. In fact, features and functions of two or more of the modules or units described above may be embodied in one module or unit according to the exemplary embodiments of the disclosure. Alternatively, the features and functions of one module or unit described above may be further divided into multiple modules or units.

Those skilled in the art can understand that various aspects of the disclosure may be implemented as a system, a method, or a program product. Therefore, the various aspects of the disclosure may be embodied in the following forms: a complete hardware implementation, a complete software implementation (including a firmware, a micro-code, etc.), or a combination of the hardware and the software, which can be collectively referred to as "circuit", "module" or "system". Those skilled in the art will readily contemplate other embodiments of the disclosure after considering the specification and practicing the invention disclosed herein. This disclosure is intended to cover any variations, uses, or adaptations of the disclosure that conform to the general principles of the disclosure and include common general knowledge or conventional technical means in the technical field not disclosed by the disclosure. The specification and embodiments are considered exemplary only, with a true scope and spirit of the disclosure being subject to the appended claims It should be understood that the disclosure is not limited to the precise structure that has been described above and illustrated in the drawings, and various modifications and changes can be made without departing from the scope thereof. The scope of the disclosure is limited only by the appended claims.

What is claimed is:

1. A visual localization method, comprising:

obtaining surface normal vectors of a current image frame;

determining a first transformation parameter between the current image frame and a reference image frame, by projecting the surface normal vectors to a Manhattan coordinate system;

performing a matching operation between feature points of the current image frame and feature points of the reference image frame, and determining, based on a matching result, a second transformation parameter between the current image frame and the reference image frame;

obtaining a target transformation parameter, based on the first transformation parameter and the second transformation parameter; and outputting, based on the target transformation parameter, a visual localization result corresponding to the current image frame, comprising:

determining a first pose corresponding to the current image frame, based on the target transformation parameter and a pose corresponding to the reference image frame;

projecting, based on the first pose, a three-dimensional point cloud of a target scene to a plane of the current image frame, and obtaining projection points corresponding to the target scene, the target scene being a scene for which the current image frame and the reference image frame are captured;

performing a matching operation between the feature points of the current image frame and the projection points, and determining, based on matching point pairs of the feature points of the current image frame and the projection points, a second pose corresponding to the current image frame; and outputting the second pose as the visual localization result corresponding to the current image frame.

2. The method as claimed in claim 1, wherein obtaining the surface normal vectors of the current image frame, comprises:

obtaining the surface normal vectors of the current image frame, by processing the current image frame through a trained surface-normal-vector estimation network.

3. The method as claimed in claim 2, wherein the surface-normal-vector estimation network comprises an encoding sub-network, a decoding sub-network and a convolutional sub-network, and obtaining the surface normal vectors of the current image frame by processing the current image frame through the trained surface-normal-vector estimation network, comprises:

obtaining a down-sampled intermediate image and a down-sampled target image, by down-sampling the current image frame through the encoding sub-network;

obtaining an up-sampled target image, by up-sampling the down-sampled target image and performing a concatenation operation on the down-sampled target image after undergoing the up-sampling and the down-sampled intermediate image, through the decoding sub-network; and obtaining the surface normal vectors, by performing a convolution operation on the up-sampled target image through the convolutional sub-network.

4. The method as claimed in claim 1, wherein determining the first transformation parameter between the current image frame and the reference image frame by projecting the surface normal vectors to the Manhattan coordinate system, comprises mapping, based on a transformation parameter for transformation from a camera coordinate system corresponding to the reference image frame to the Manhattan coordinate system, the surface normal vectors to the Manhattan coordinate system;

determining, based on an offset of the surface normal vectors in the Manhattan coordinate system, a transformation parameter for transformation from a camera coordinate system corresponding to the current image frame to the Manhattan coordinate system; and determining the first transformation parameter between the current image frame and the reference image frame, based on the transformation parameter for transformation from the camera coordinate system corresponding to the reference image frame to the Manhattan coordinate system and the transformation parameter for transformation from the camera coordinate system corresponding to the current image frame to the Manhattan coordinate system.

5. The method as claimed in claim 4, wherein mapping, based on the transformation parameter for transformation from the camera coordinate system corresponding to the reference image frame to the Manhattan coordinate system, the surface normal vectors to the Manhattan coordinate system, comprises:

mapping, based on the transformation parameter for transformation from the camera coordinate system corresponding to the reference image frame to the Manhattan coordinate system, three-dimensional coordinates of the surface normal vectors in the camera coordinate system corresponding to the reference image frame to three-dimensional coordinates in the Manhattan coordinate system; and mapping the three-dimensional coordinates of the surface normal vectors in the Manhattan coordinate system to two-dimensional coordinates of the surface normal vectors on a tangent plane of each axis of the Manhattan coordinate system.

6. The method as claimed in claim 5, wherein determining, based on the offset of the surface normal vectors in the Manhattan coordinate system, the transformation parameter for transformation from the camera coordinate system corresponding to the current image frame to the Manhattan coordinate system, comprises:

clustering the two-dimensional coordinates of the surface normal vectors on the tangent plane, and determining, based on a cluster center, an offset of the surface normal vectors on the tangent plane;

mapping two-dimensional coordinates of the offset on the tangent plane into three-dimensional coordinates in the Manhattan coordinate system; and determining the transformation parameter for transformation from the camera coordinate system corresponding to the current image frame to the Manhattan coordinate system, based on the transformation parameter for transformation from the camera coordinate system corresponding to the reference image frame to the Manhattan coordinate system and the three-dimensional coordinates of the offset in the Manhattan coordinate system.

7. The method as claimed in claim 6, wherein mapping the two-dimensional coordinates of the offset on the tangent plane into the three-dimensional coordinates in the Manhattan coordinate system, comprises:

obtaining the three-dimensional coordinates of the offset in the Manhattan coordinate system, by mapping the two-dimensional coordinates of the offset on the tangent plane to a unit sphere of the Manhattan coordinate system through exponential mapping.

8. The method as claimed in claim 4, wherein the transformation parameter for transformation from the camera coordinate system corresponding to the reference image frame to the Manhattan coordinate system comprises: a relative rotation matrix between the camera coordinate system corresponding to the reference image frame and the Manhattan coordinate system.

9. The method as claimed in claim 1, wherein performing the matching operation between the feature points of the current image frame and the feature points of the reference image frame, comprises:

obtaining first matching information, by performing the matching operation from the feature points of the reference image frame to the feature points of the current image frame;

obtaining second matching information, by performing the matching operation from the feature points of the current image frame to the feature points of the reference image frame; and obtaining the matching result, based on the first matching information and the second matching information.

10. The method as claimed in claim 9, wherein obtaining the matching result based on the first matching information and the second matching information, comprises:

taking, as the matching result, an intersection or a union of the first matching information and the second matching information.

11. The method as claimed in claim 9, wherein performing the matching operation between the feature points of the current image frame and the feature points of the reference image frame, further comprises:

removing, based on a geometric constraint on the current image frame and the reference image frame, false matching point pairs of the current image frame and the reference image frame, from the matching result.

12. The method as claimed in claim 1, wherein the first transformation parameter comprises a first rotation matrix, the second transformation parameter comprises a second rotation matrix, and obtaining the target transformation parameter based on the first transformation parameter and the second transformation parameter, comprises:

establishing a loss function, based on a deviation between first rotation matrix and the second rotation matrix; and adjusting the second rotation matrix iteratively to reduce a value of the loss function until the loss function converges, and determining the adjusted second rotation matrix as a rotation matrix of the target transformation parameter.

13. The method as claimed in claim 1, wherein performing the matching operation between the feature points of the current image frame and the projection points, comprises:

obtaining third matching information, by performing the matching operation from the projection points to the feature points of the current image frame;

obtaining fourth matching information, by performing the matching operation from the feature points of the current image frame to the projection points; and obtaining, based on the third matching information and the fourth matching information, the matching point pairs of the feature points of the current image frame and the projection points.

14. The method as claimed in claim 13, wherein determining, based on the matching point pairs of the feature points of the current image frame and the projection points, the second pose corresponding to the current image frame, comprises:

obtaining, by replacing the projection points in the matching point pairs with three-dimensional points in the three-dimensional point cloud, a matching relationship between the feature points of the current image frame and the three-dimensional points, and solving the second pose based on the matching relationship.

15. The method as claimed in claim 1, wherein obtaining the surface normal vectors of the current image frame, comprises:

obtaining the surface normal vector of each pixel point in the current image frame.

16. The method as claimed in claim 15, wherein determining the first transformation parameter between the current image frame and the reference image frame by projecting the surface normal vectors to the Manhattan coordinate system, comprises:

determining the first transformation parameter between the current image frame and the reference image frame, by projecting the surface normal vector of each pixel point to the Manhattan coordinate system.

17. A non-transitory computer-readable storage medium storing a computer program thereon, wherein the computer program, when being executed by a processor, causes a visual localization method to be implemented, and the method comprises:

obtaining a surface normal vector of a current image frame;

projecting the surface normal vector to a Manhattan coordinate system, and determining, based on an offset of the projection of the surface normal vector on the Manhattan coordinate system, a first transformation parameter between the current image frame and a reference image frame;

performing a matching operation between feature points of the current image frame and feature points of the reference image frame, and determining, based on a matching result, a second transformation parameter between the current image frame and the reference image frame;

obtaining a target transformation parameter, based on the first transformation parameter and the second transformation parameter; and outputting, based on the target transformation parameter, a visual localization result corresponding to the current image frame, comprising:

determining a first pose corresponding to the current image frame, based on the target transformation parameter and a pose corresponding to the reference image frame;

projecting, based on the first pose, a three-dimensional point cloud of a target scene to a plane of the current image frame, and obtaining projection points corresponding to the target scene, the target scene being a scene for which the current image frame and the reference image frame are captured;

performing a matching operation between the feature points of the current image frame and the projection points, and determining, based on matching point pairs of the feature points of the current image frame and the projection points, a second pose corresponding to the current image frame; and outputting the second pose as the visual localization result corresponding to the current image frame.

18. An electronic device, comprising:

a processor; and a memory, configured to store executable instructions for the processor, wherein the processor is configured to execute the executable instructions to implement a visual localization method comprising:

obtaining surface normal vectors of a current image frame;

determining, based on projections of the surface normal vectors on a Manhattan coordinate system, a first transformation parameter between the current image frame and a reference image frame;

determining a second transformation parameter between the current image frame and the reference image frame, by performing a matching operation between feature points of the current image frame and feature points of the reference image frame;

obtaining a target transformation parameter, based on the first transformation parameter and the second transformation parameter; and outputting, based on the target transformation parameter, a visual localization result corresponding to the current image frame, comprising:

determining a first pose corresponding to the current image frame, based on the target transformation parameter and a pose corresponding to the reference image frame;

projecting, based on the first pose, a three-dimensional point cloud of a target scene to a plane of the current image frame, and obtaining projection points corresponding to the target scene, the target scene being a scene for which the current image frame and the reference image frame are captured;

performing a matching operation between the feature points of the current image frame and the projection points, and determining, based on matching point pairs of the feature points of the current image frame and the projection points, a second pose corresponding to the current image frame; and outputting the second pose as the visual localization result corresponding to the current image frame.

19. The electronic device as claimed in claim 18, wherein determining, based on the projections of the surface normal vectors on the Manhattan coordinate system, the first transformation parameter between the current image frame and the reference image frame, comprises:

mapping, based on a transformation parameter for transformation from a camera coordinate system corresponding to the reference image frame to the Manhattan coordinate system, the surface normal vectors to the Manhattan coordinate system;

determining, based on an offset of the surface normal vectors in the Manhattan coordinate system, a transformation parameter for transformation from a camera coordinate system corresponding to the current image frame to the Manhattan coordinate system; and determining the first transformation parameter between the current image frame and the reference image frame, based on the transformation parameter for transformation from the camera coordinate system corresponding to the reference image frame to the Manhattan coordinate system and the transformation parameter for transformation from the camera coordinate system corresponding to the current image frame to the Manhattan coordinate system.

20. The electronic device as claimed in claim 18, wherein performing the matching operation between the feature points of the current image frame and the projection points, comprises:

obtaining third matching information, by performing the matching operation from the projection points to the feature points of the current image frame;

obtaining fourth matching information, by performing the matching operation from the feature points of the current image frame to the projection points; and obtaining, based on the third matching information and the fourth matching information, the matching point pairs of the feature points of the current image frame and the projection points; and wherein determining, based on the matching point pairs of the feature points of the current image frame and the projection points, the second pose corresponding to the current image frame, comprises:

obtaining, by replacing the projection points in the matching point pairs with three-dimensional points in the three-dimensional point cloud, a matching relationship between the feature points of the current image frame and the three-dimensional points, and solving the second pose based on the matching relationship.

\* \* \* \* \*